(12) United States Patent
Chu et al.

(10) Patent No.: US 11,540,200 B2
(45) Date of Patent: Dec. 27, 2022

(54) APPARATUS AND METHOD FOR MULTI-LINK COMMUNICATIONS

(71) Applicant: NXP USA, Inc., Austin, TX (US)

(72) Inventors: Liwen Chu, San Ramon, CA (US); Young Hoon Kwon, Laguna Niguel, CA (US); Hongyuan Zhang, Fremont, CA (US); Huiling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/225,058

(22) Filed: Apr. 7, 2021

(65) Prior Publication Data

US 2021/0314846 A1 Oct. 7, 2021

Related U.S. Application Data

(60) Provisional application No. 63/072,038, filed on Aug. 28, 2020, provisional application No. 63/022,522, filed on May 10, 2020, provisional application No. 63/015,639, filed on Apr. 26, 2020, provisional application No. 63/006,430, filed on Apr. 7, 2020.

(51) Int. Cl.
*H04W 40/24* (2009.01)
*H04W 76/11* (2018.01)
*H04W 84/12* (2009.01)

(52) U.S. Cl.
CPC ....... *H04W 40/248* (2013.01); *H04W 40/244* (2013.01); *H04W 76/11* (2018.02); *H04W 84/12* (2013.01)

(58) Field of Classification Search
CPC ..... H04W 48/16; H04W 88/10; H04W 84/12; H04W 4/06; H04W 80/02; H04W 72/0453; H04W 4/80; H04W 52/0216; H04W 48/08; H04W 76/11; H04W 74/0808; H04W 8/245; H04W 12/73; H04W 72/0446; H04W 76/15; H04W 4/23; H04W 92/02; H04W 48/12; H04W 88/02; H04W 92/10; Y02D 30/70; H04L 1/1621; H04L 1/1685
See application file for complete search history.

(56) References Cited

U.S. PATENT DOCUMENTS

2019/0335454 A1* 10/2019 Huang ................ H04L 41/0893
2020/0221545 A1* 7/2020 Stacey ................. H04W 48/16
(Continued)

OTHER PUBLICATIONS

Institute of Electrical and Electronics Engineers (IEEE), "IEEE P802.11ax™/D6.0; Draft Standard for Information technology—Telecommunications and information exchange between systems Local and metropolitan area networks Specific requirements", Nov. 2019, 780 pgs.

(Continued)

*Primary Examiner* — Jung Liu
*Assistant Examiner* — Jung-Jen Liu

(57) ABSTRACT

Embodiments of an apparatus and method are disclosed. In an embodiment, a method of multi-link communications involves at a first multi-link device, generating a management frame having reduced neighbor report (RNR) information related to the first multi-link device, and at the first multi-link device, transmitting the management frame having one of the RNR information and a multi-link element (ML IE) or both the RNR information and the ML IE to a second multi-link device.

18 Claims, 16 Drawing Sheets

(56) References Cited

U.S. PATENT DOCUMENTS

| | | | |
|---|---|---|---|
| 2021/0014776 A1* | 1/2021 | Patil | H04W 74/0808 |
| 2021/0014911 A1* | 1/2021 | Patil | H04W 48/08 |
| 2021/0120599 A1* | 4/2021 | Cariou | H04W 76/11 |
| 2021/0282229 A1* | 9/2021 | Stacey | H04W 52/0216 |
| 2021/0289568 A1* | 9/2021 | Cariou | H04W 76/11 |
| 2021/0400662 A1* | 12/2021 | Huang | H04W 72/048 |

OTHER PUBLICATIONS

U.S. Appl. No. 17/139,679 "Method and Apparatus for Multi-Link Operations," filed Dec. 31, 2020, 48 pages.

Chu, Liwen et al. "Beacon, Capability, Operating Parameters", IEEE 802.11-19/0395r0, Mar. 1, 2020, 12 pgs.

* cited by examiner

APPARATUS AND METHOD FOR MULTI-LINK COMMUNICATIONS

CROSS-REFERENCE TO RELATED APPLICATIONS

This application is entitled to the benefit of U.S. Provisional Patent Application Ser. No. 63/006,430, filed on Apr. 7, 2020, U.S. Provisional Patent Application Ser. No. 63/015,639, filed on Apr. 26, 2020, U.S. Provisional Patent Application Ser. No. 63/022,522, filed on May 10, 2020, and U.S. Provisional Patent Application Ser. No. 63/072,038, filed on Aug. 28, 2020, which are incorporated herein by reference.

BACKGROUND

In multi-link communications, an access point (AP) multi-link device, e.g., an AP multi-link logical device (MLD) or an AP multi-link logical entity (MLLE), can transmit data to a non-AP multi-link device through one or more communications links. For example, a wireless AP multi-link device may wirelessly transmit data to one or more wireless stations in a non-AP multi-link device through one or more wireless communications links. To facilitate the proper data transmission within a multi-link communications system, there is a need for multi-link communications technology that can efficiently convey communications signaling information, for example, information related to data, communications links, and/or multi-link devices (e.g., operation and/or capability parameters of multi-link devices) within the multi-link communications system.

SUMMARY

Embodiments of an apparatus and method are disclosed. In an embodiment, a method of multi-link communications involves at a first multi-link device, generating a management frame having reduced neighbor report (RNR) information related to the first multi-link device, and at the first multi-link device, transmitting the management frame having one of the RNR information and a multi-link element (ML IE) or both the RNR information and the ML IE to a second multi-link device. Other embodiments are also described.

In some embodiments, the management frame comprises a beacon frame, a probe response frame, an association response frame, a probe request frame, or an association request frame.

In some embodiments, the first multi-link device comprises an access point (AP) multi-link device, and wherein the RNR information includes a link identifier and a multi-link device identifier to identify an AP of the AP multi-link device.

In some embodiments, a link identifier of each AP in the AP multi-link device is uniquely coded in RNR information announced by different APs of the AP multi-link device.

In some embodiments, the ML IE carried in the management frame includes ML common information and a plurality of per link information profiles of a reported link between the first multi-link device and the second multi-link device.

In some embodiments, the ML common information includes a type of a multi-link device operation and information common for multiple communications links.

In some embodiments, the ML common information includes a Media Access Control (MAC) address of the first multi-link device.

In some embodiments, the management frame comprises a probe request frame that includes information that indicates whether full information or partial information of an access point (AP) is requested.

In some embodiments, the probe request frame further includes an indication of a soliciting of a critical update.

In some embodiments, the first multi-link device comprises a non-access point (AP) multi-link device, wherein the second multi-link device comprises an AP multi-link device, and the probe request frame further includes a multi-link element that includes a link identifier of a reported link when the non-AP multi-link device requests full information of an AP of the AP multi-link device in the reported link.

In some embodiments, the requested full information of the AP is carried in a beacon frame.

In some embodiments, the first multi-link device comprises a non-access point (AP) multi-link device, the second multi-link device comprises an AP multi-link device, and an indication for critical update and a link identifier are carried in a per link profile to request a critical update of an AP identified by the link identifier.

In some embodiments, the first and second multi-link devices are compatible with an Institute of Electrical and Electronics Engineers (IEEE) 802.11 protocol.

In some embodiments, a multi-link communications system includes a first multi-link device configured to generate a management frame having reduced neighbor report (RNR) information related to the first multi-link device and transmit the management frame having the RNR information to a second multi-link device, and the second multi-link device.

In some embodiments, the first and second multi-link devices are compatible with an Institute of Electrical and Electronics Engineers (IEEE) 802.11 protocol.

In some embodiments, a method of multi-link communications involves at an access point (AP) multi-link device, generating a management frame having reduced neighbor report (RNR) information regarding the AP multi-link device and at the AP multi-link device, transmitting the management frame having the RNR information to a plurality of non-AP multi-link devices.

In some embodiments, the management frame comprises a beacon frame, a probe response frame, or an association response frame.

In some embodiments, the RNR information includes a link identifier and a multi-link device identifier to identify an AP of the AP multi-link device.

In some embodiments, a link identifier of each AP in the AP multi-link device is uniquely coded in RNR information announced by different APs of the AP multi-link device.

In some embodiments, a multi-link (ML) element carried in the management frame includes ML common information and a plurality of per link information profiles of a reported link between the AP multi-link device and the non-AP multi-link devices.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
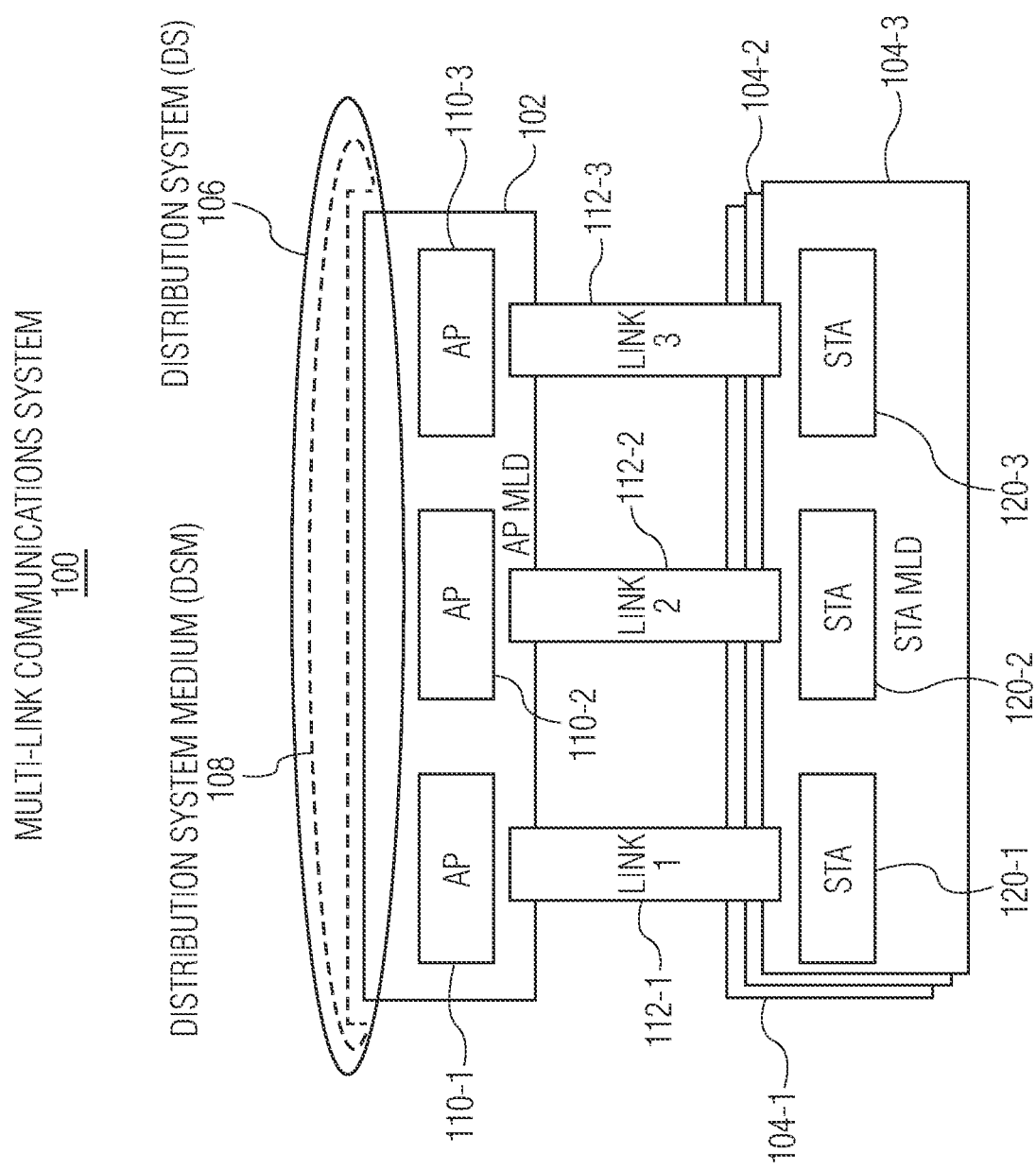
FIG. 1 depicts a multi-link communications system in accordance with an embodiment of the invention.

FIG. 1 depicts a multi-link communications system 100 in accordance with an embodiment of the invention. In the embodiment depicted in FIG. 1, the multi-link communications system includes at least one AP multi-link device, which is, for example, implemented as an AP multi-link logical device (MLD) 102, and multiple non-AP multi-link devices, which are, for example, implemented as station (STA) MLDs 104-1, 104-2, 104-3. The multi-link communications system can be used in various applications, such as industrial applications, medical applications, computer applications, and/or consumer or appliance applications. In some embodiments, the multi-link communications system is a wireless communications system, such as a wireless communications system compatible with an Institute of Electrical and Electronics Engineers (IEEE) 802.11 protocol. For example, the multi-link communications system may be a wireless communications system compatible with an IEEE 802.11be protocol. Although the depicted multi-link communications system 100 is shown in FIG. 1 with certain components and described with certain functionality herein, other embodiments of the multi-link communications system 100 may include fewer or more components to implement the same, less, or more functionality. For example, although the multi-link communications system 100 is shown in FIG. 1 includes the AP MLD 102 and the STA MLDs 104-1, 104-2, 104-3, in other embodiments, the multi-link communications system includes other multi-link devices such as one or more AP MLLEs and/or one or more STA MLLEs. In another example, in some embodiments, the multi-link communications system includes multiple AP MLDs, more than three STA MLDs, and/or less than three STA MLDs. In yet another example, although the multi-link communications system 100 is shown in FIG. 1 as being connected in a certain topology, the network topology of the multi-link communications system 100 is not limited to the topology shown in FIG. 1.

In the embodiment depicted in FIG. 1, the AP MLD 102 includes multiple APs 110-1, 110-2, 110-3. The APs 110-1, 110-2, 110-3 may be implemented in hardware (e.g., circuits), software, firmware, or a combination thereof. At least one of the APs 110-1, 110-2, 110-3 may be fully or partially implemented as an integrated circuit (IC) device. In some embodiments, the AP MLD and its affiliated APs 110-1, 110-2, 110-3 are compatible with at least one wireless local area network (WLAN) communications protocol (e.g., at least one IEEE 802.11 protocol). For example, the AP MLD and its affiliated APs 110-1, 110-2, 110-3 may be compatible with an IEEE 802.11be protocol. In some embodiments, an AP MLD is a wireless device that connects to a local area network (e.g., a LAN) and/or to a backbone network (e.g., the Internet) through a wired connection and that wirelessly connects to wireless stations (STAs), for example, through one or more WLAN communications protocols, such as an IEEE 802.11 protocol. In some embodiment, the common part of the AP MLD implements the functionalities common to its affiliated APs, the APs of the AP MLD implements the functionalities related to link related operation, e.g., backoff, power save management. In some embodiments, an AP includes at least one antenna, at least one transceiver operably connected to the at least one antenna, and at least one controller operably connected to the corresponding transceiver. In some embodiments, the least one transceiver includes a physical layer (PHY) device. The at least one controller operably may be configured to control the at least one transceiver to process received packets through the at least one antenna. In some embodiments, the at least one controller is implemented within a processor, such as a microcontroller, a host processor, a host, a digital signal processor (DSP), or a central processing unit (CPU), which can be integrated in a corresponding transceiver. Each of the APs 110-1, 110-2, 110-3 of the AP MLD may operate in a different frequency band. For example, the AP 110-1 may operate in 2.4 gigahertz (GHz) frequency band, the AP 110-2 may operate in 5 GHz frequency band, and the AP 110-3 may operate in 6 GHz frequency band. In the embodiment depicted in FIG. 1, the AP MLD is connected to a distribution system (DS) 106 through a distribution system medium (DSM) 108. The distribution system (DS) 106 may be a wired network or a wireless network that is connected to a backbone network such as the Internet. The DSM 108 may be a wired medium (e.g., Ethernet cables, telephone network cables, or fiber optic cables) or a wireless medium (e.g., infrared, broadcast radio, cellular radio, or microwaves). Although the AP MLD 102 is shown in FIG. 1 as including three APs, other embodiments of the AP MLD 102 may include fewer than three APs or more than three APs. In addition, although some examples of the DSM 108 are described, the DSM 108 is not limited to the examples described herein.

In the embodiment depicted in FIG. 1, the STA MLD 104-1 includes multiple non-AP stations (STAs) 120-1, 120-2, 120-3. The STAs 120-1, 120-2, 120-3 may be implemented in hardware (e.g., circuits), software, firmware, or a combination thereof. At least one of the STAs 120-1, 120-2, 120-3 may be fully or partially implemented as an IC device. In some embodiments, the STA MLD with affiliated STAs 120-1, 120-2, 120-3 is a wireless device that wirelessly connects to wireless AP MLD through various APs affiliated with the AP MLD. For example, the STA MLD with the affiliated STAs 120-1, 120-2, 120-3 may be a laptop, a desktop personal computer (PC), a mobile phone, or other wireless device that supports at least one WLAN communications protocol. In some embodiments, the STA MLD and its affiliated STAs 120-1, 120-2, 120-3 are compatible with at least one IEEE 802.11 protocol (e.g., an IEEE 802.11be protocol). In some embodiments, the STA MLD has one Media Access Control (MAC) data service interface. In an embodiment, a single address is associated with the MAC data service interface and is used to communicate on the DSM 108. In some embodiments, the AP MLD 102 and/or the STA MLDs 104-1, 104-2, 104-3 identify which communications links support the multi-link operation during a multi-link operation setup phase and/or exchanges information regarding multi-link capabilities during the multi-link operation setup phase. Each of the STAs 120-1, 120-2, 120-3 of the STA MLD may operate in a different frequency band. For example, the STA 120-1 may operate in 2.4 GHz frequency band, the STA 120-2 may operate in 5 GHz frequency band, and the STA 120-3 may operate in 6 GHz frequency band. Each of the MLDs 104-2, 104-3 may be the same as or similar to the MLD 104-1. For example, the MLD 104-2 or 104-3 includes multiple non-AP STAs. In some embodiments, each STA includes at least one antenna, at least one transceiver operably connected to the at least one antenna, and at least one controller connected to the corresponding transceiver. In some embodiments, the at least one transceiver includes a PHY device. The at least one controller operably may be configured to control the at least one transceiver to process received packets through the at least one antenna. In some embodiments, the at least one controller is implemented within a processor, such as a microcontroller, a host processor, a host, a DSP, or a CPU, which can be integrated in a corresponding transceiver. In the embodiment depicted in FIG. 1, the STA MLD 104-1, 104-2, or 104-3 communicates with the AP MLD 102 through multiple communications links 112-1, 112-2, 112-3. For example, each of the STAs 120-1, 120-2, 120-3 communicates with an AP 110-1, 110-2, or 110-3 through a corresponding communications link 112-1, 112-2, or 112-3. Although the STA MLD 104-1 is shown in FIG. 1 as including three non-AP STAs, other embodiments of the STA MLD 104-1 may include fewer than three non-AP STAs or more than three non-AP STAs. In addition, although the AP MLD 102 communicates (e.g., wirelessly communicates) with the STA MLDs 104-1, 104-2, 104-3 through multiple links 112-1, 112-2, 112-3, in other embodiments, the AP MLD 102 may communicate (e.g., wirelessly communicates) with the STA MLDs through more than three communications links or less three than communications links.

Figure 2:
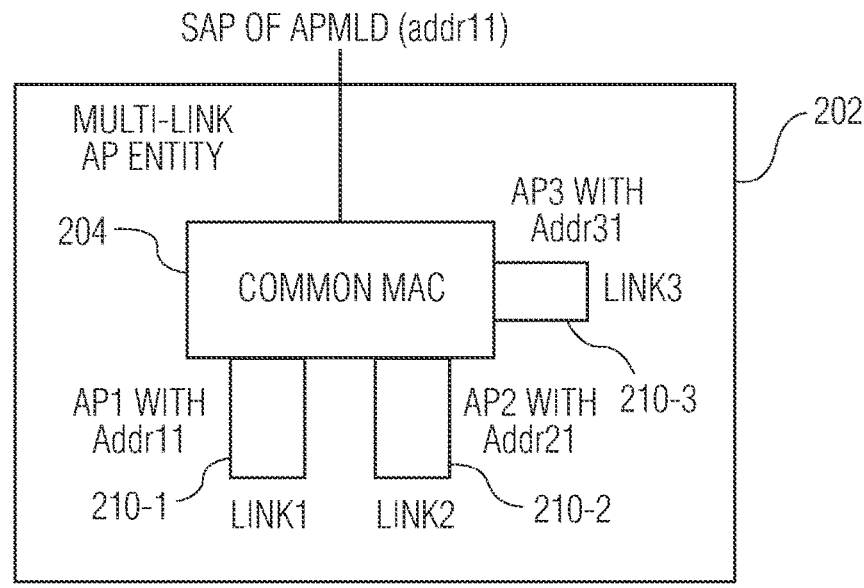
FIG. 2 depicts an AP MLD in accordance with an embodiment of the invention.

In some embodiments, all the APs affiliated with an AP MLD have same service set identifier (SSID). FIG. 2 depicts an AP MLD 202 in accordance with an embodiment of the invention. In the embodiment depicted in FIG. 2, the AP MLD 202 with a MAC SAP address, addr11, includes multiple APs 210-1, 210-2, 210-3 with addresses (e.g., MAC addresses), Addr11, Addr21, that have the same SSID and a common MAC unit or interface 204 that is connected to the APs 210-1, 210-2, 210-3. At least one of the APs 210-1, 210-2, 210-3 may be fully or partially implemented as an IC device. In some embodiments, the AP MLD and its affiliated APs 210-1, 210-2, 210-3 are compatible with at least one WLAN communications protocol (e.g., at least one IEEE 802.11 protocol). For example, the AP MLD and its affiliated APs 210-1, 210-2, 210-3 may be compatible with an IEEE 802.11be protocol. In the embodiment depicted in FIG. 2, the APs 210-1, 210-2, 210-3 communicate with other entities through multiple communications links. Although the AP MLD 202 is shown in FIG. 2 as including three APs 210-1, 210-2, 210-3, other embodiments of the AP MLD 202 may include fewer than three APs or more than three APs. In addition, although the AP MLD 202 communicates (e.g., wirelessly communicates) with other entities through three links, in other embodiments, the AP MLD 202 may communicate (e.g., wirelessly communicates) with other entities through more than three communications links or less three than communications links. In some embodiments, APs affiliated with an AP MLD have different SSIDs.

For security requirement of APs affiliated with an AP MLD, all the APs affiliated with an AP MLD have same security policy, encryption, and/or decryption methods. In some embodiments, APs affiliated with an AP MLD have different security policy, encryption, and/or decryption methods. For example, APs for STA MLDs have one security policy while APs for legacy STAs have another security policy.

In some embodiments, beacon frames in one link include partial Extremely High Throughput (EHT) capability parameters and basic service set (BSS) operating parameters of another link. For example, enhanced reduced neighbor report (RNR) is used to carry such simplified information. In some embodiments, probe request/response, association request/response in one link transmit all the EHT capabilities, BSS operating parameters of another link. In an embodiment, if an AP in a link that is affiliated with an AP MLD has transmitted BSSID, the AP in another link that is affiliated with the same AP MLD can have a non-transmitted BSSID. The Multiple BSSID elements in different links can define the different number of non-transmitted BSSIDs. An ML IE element is defined to include capabilities, operating parameters of link 1 when the ML IE element is transmitted in link2. The ML IE element can be transmitted as an element for the APs in other links affiliated with the same MLD as the AP that transmits the ML IE element. The ML IE element can be a subelement of the non-transmitted basic service set identifier (BSSID) profile subelement for the APs affiliated with the same MLD as the AP with non-transmitted BSSID.

In some embodiments, an MLD identifier subfield for an AP announced by RNR element contains information about the identifies of the AP MLD with which the AP is affiliated. A device may include multiple AP MLDs that include different links. For example, a device may have 3 AP MLDs, which are AP MLD1, AP MLD2, and AP MLD3. In this example, AP MLD1 has three radios in 2.4 GHz band, 5 GHz band, and 6 GHz band with link IDs of 0, 1, 2, respectively; AP MLD2 has two radios in 5 GHz band and 6 GHz band with link IDs of 0 and 1, respectively; and AP MLD3 has two radios in 2.4 GHz band and 6 GHz band with link IDs of 0 and 1, respectively. In some embodiments, for APs affiliated with the same AP MLD as the frame transmitter that does not support transmitted BSSID feature, the AP MLD ID is 0. In some embodiments, for the APs affiliated with the same AP MLD as the frame transmitter (AP with transmitted BSSID) that supports transmitted BSSID feature, the AP MLD ID is 0. In an embodiment, because in different links the APs with the transmitted BSSIDs can be affiliated with different AP MLDs, an AP MLD in different links have different AP MLD IDs. In some embodiments, for the APs affiliated with the same AP MLD as an AP with the non-transmitted BSSID of the reporting link, the AP MLD ID is the BSSID index defined by the multiple BSSID element of the reporting link.

In some embodiments, a link identifier within an AP MLD for an AP contains information about on which link the AP operates. This link identifier can be commonly coded in an AP device for all AP MLDs, e.g., in AP device with three links of 2.4G Hz, 5 GHz, 6 GHz. For example, a 2.4 GHz link has a link identifier of 0, a 5 GHz link has a link identifier of 1, and a 6 GHz link has a link identifier of 2. The combination of a link identifier within the AP MLD and an MLD identifier is used to identify an AP. An AP's BSSID can also be used to identify the AP.

A device may include multiple co-located AP MLDs where each AP MLD can have different links. For example, a device may have 3 AP MLDs, which are AP MLD1, AP MLD2, and AP MLD3. In this example, AP MLD1 has three links in 2.4 GHz band, 5 GHz band and 6 GHz band; AP MLD2 has two links in 5 GHz band and 6 GHz band; and AP MLD3 has two links in 2.4 GHz band and 6 GHz band.

In some embodiments, the link ID in different AP MLDs of a device is independently coded with the continuous values of 0, 1, 2 etc. For example, in a device AP with 3 AP MLDs, which are AP MLD1, AP MLD2, and AP MLD3, AP MLD1 has three links in 2.4 GHz band, 5 GHz band and 6 GHz band with link IDs of 0, 1, 2, respectively; AP MLD2 has two links in 5 GHz band and 6 GHz band with link IDs of 0 and 1, respectively; and AP MLD3 has two links in 2.4 GHz band and 6 GHz band with link IDs of 0 and 1, respectively. In some embodiments, the link ID of an AP in the AP MLD's multi-link (ML) element announced by different APs of the AP MLD has fixed value. For example, in an AP MLD with 3 APs, AP1, AP2, AP3, in AP1's beacon, AP1 has link ID 0, AP2 has link ID 1, AP3 has link ID2. In AP2's Beacon, AP1 has link ID 0, AP2 has link ID 1, AP3 has link ID2. In some embodiments, the link ID of a reported link's AP is announced in an RNR element. In some embodiments, the link ID of the reporting link's AP is acquired through the value other than the link IDs of the reported links affiliated with same AP MLD as the reporting AP. In some embodiments, the APs with the same AP MLD ID are identified by, for the APs affiliated with the same AP MLD as the frame transmitter that does not support transmitted BSSID feature, the AP MLD ID is 0;

for the APs affiliated with same AP MLD as the frame transmitter (AP with transmitted BSSID) that supports transmitted BSSID feature, the AP MLD ID is 0; and for the APs affiliated with same AP MLD as an AP with the non-transmitted BSSID of the reporting link, the AP MLD ID is BSSID index.

In some embodiments, the link ID in different AP MLDs of a device is globally coded. For example, in a device AP with 3 AP MLDs, which are AP MLD1, AP MLD2, and AP MLD3, AP MLD1 has three links in 2.4 GHz band, 5 GHz band and 6 GHz band; AP MLD2 has two links in 5 GHz band and 6 GHz band, AP MLD3 has two links in 2.4 GHz band and 6 GHz band. In this example, 2.4 GHz band link has link ID 0, 5 GHz band link has link ID 1, and 2.4 GHz band link has link ID 2.

Figure 3:
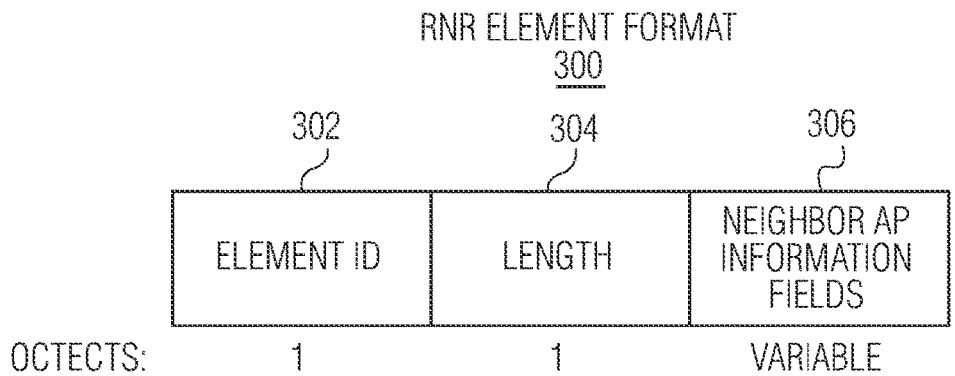
FIG. 3 depicts an example RNR element format that can be used in a multi-link operation by the multi-link communications system depicted in FIG. 1.

FIG. 3 depicts an example RNR element format 300 that can be used in a multi-link operation by the multi-link communications system 100 depicted in FIG. 1. In the example depicted in FIG. 3, the RNR element format 300 includes an element ID field 302 (e.g., 1 octet) that may contain identification information this element represents, a length field 304 (e.g., 1 octet) that may contain element length information, and a neighbor AP information field 306, which may contain information regarding neighbor AP and have variable size.

Figure 4:
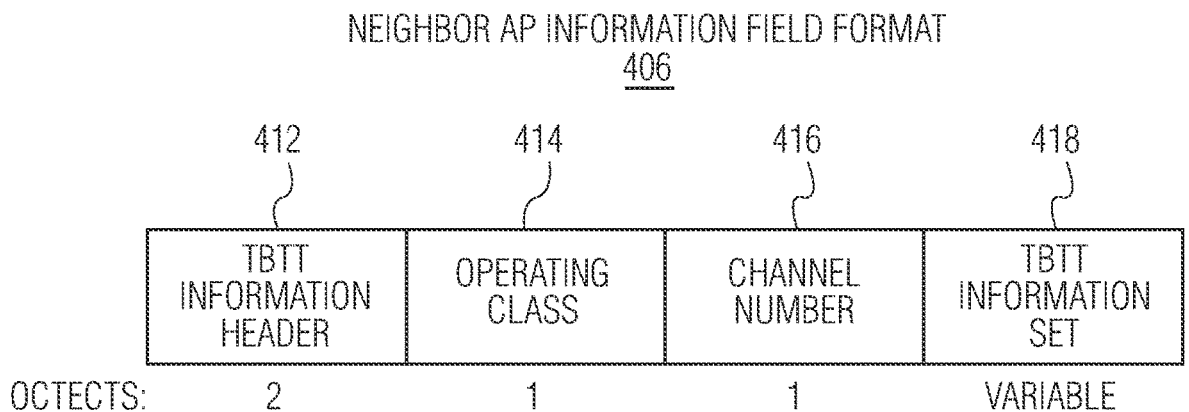
FIG. 4 depicts an example neighbor AP information field format that can be used in a multi-link operation by the multi-link communications system depicted in FIG. 1.

FIG. 4 depicts an example neighbor AP information field format 406 that can be used in a multi-link operation by the multi-link communications system 100 depicted in FIG. 1. In the example depicted in FIG. 4, the neighbor AP information field format 406 includes a Target Beacon Transmission Time (TBTT) information header field 412 (e.g., 2 octets) that may contain TBTT header information, an operating class field 414 (e.g., 1 octet), a channel number field 416 (e.g., 1 octet), and a TBTT information set field 418 that may have variable size.

Figure 5:
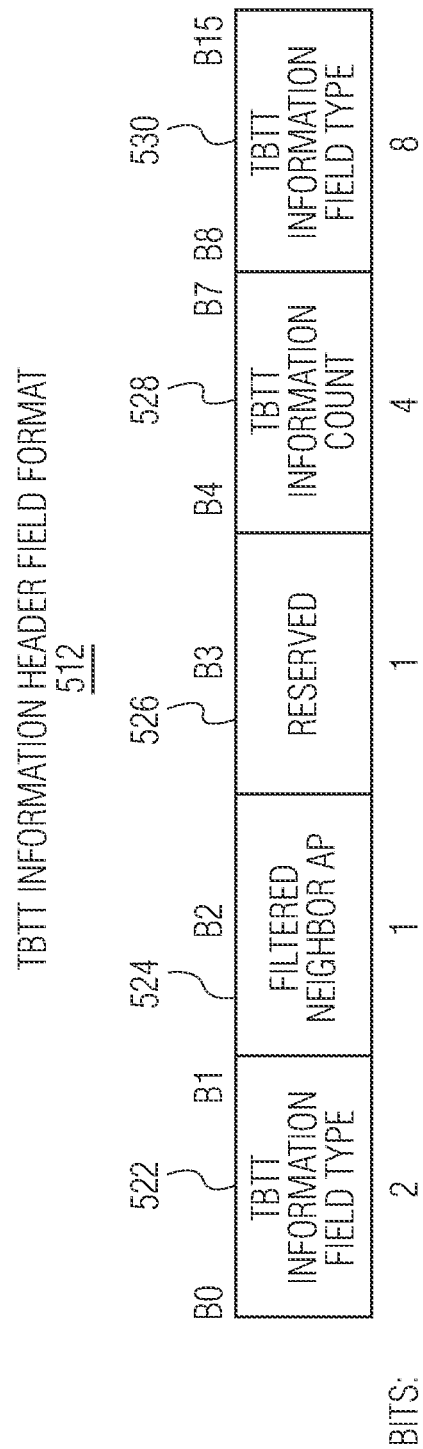
FIG. 5 depicts an example Target Beacon Transmission Time (TBTT) information header field format that can be used in a multi-link operation by the multi-link communications system depicted in FIG. 1.

FIG. 5 depicts an example TBTT information header field format 512 that can be used in a multi-link operation by the multi-link communications system 100 depicted in FIG. 1. In the example depicted in FIG. 5, the TBTT information header field format 512 includes a TBTT information filed type 522 (e.g., 2 bits, B0, B1), a filtered neighbor AP field 524 (e.g., 1 bit, B2), a reserved field 526 (e.g., 1 bit, B3), a TBTT information count field 528 (e.g., 4 bits, B4-B7), and a TBTT length field 530 (e.g., 8 bits, B8-B15).

Figure 6:
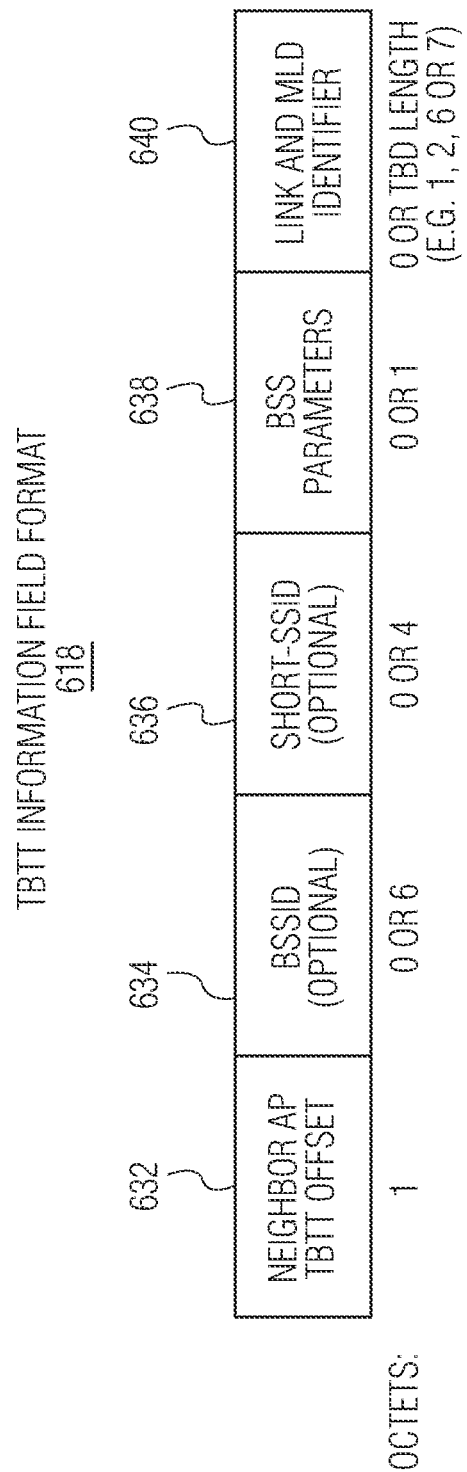
FIG. 6 depicts an example TBTT information field that can be used in a multi-link operation by the multi-link communications system depicted in FIG. 1.

FIG. 6 depicts an example TBTT information field 618 that can be used in a multi-link operation by the multi-link communications system 100 depicted in FIG. 1. In the example depicted in FIG. 6, the TBTT information field 618 includes a neighbor AP TBTT offset field 632 (e.g., 1 octet), an optional BSSID field 634 (e.g., 0 octet or 6 octets), an optional short BSSID field 636 (e.g., 0 octet or 4 octets), an optional BSS parameter field 638 (e.g., 0 octet or 1 octet), and a link and MLD identifier field 640 (e.g., 0 octet or variable size that is to be determined (TBD) 1, 2, 4, or 7 octet(s)).

Figure 7:
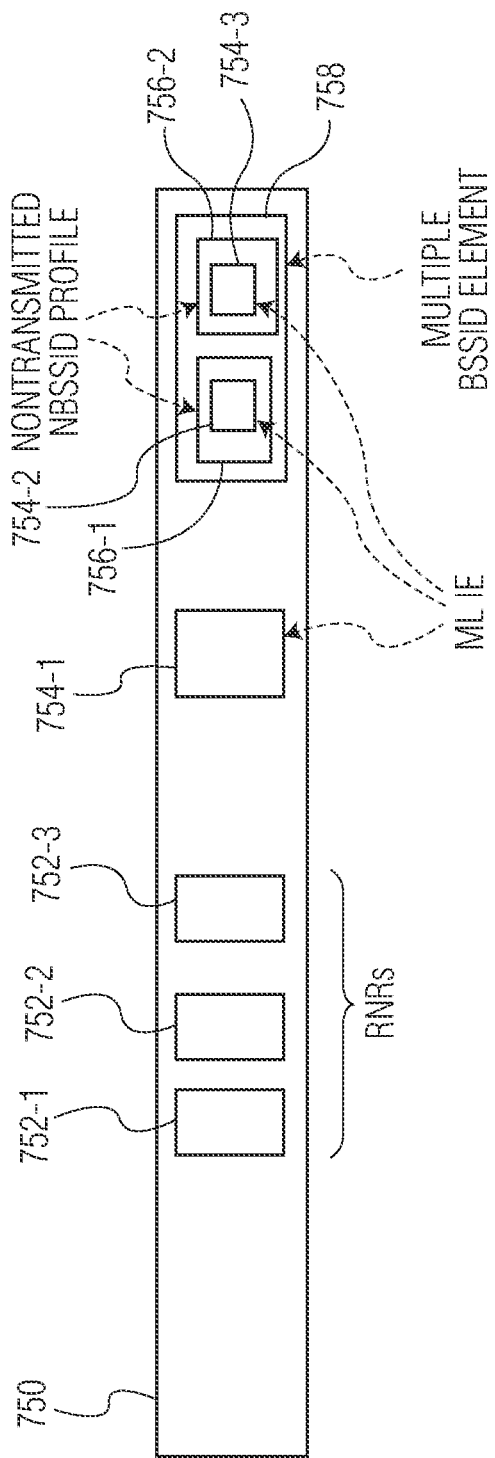
FIG. 7 depicts an example basic service set identifier (BSSID)'s beacon that can be used in a multi-link operation by the multi-link communications system depicted in FIG. 1.

FIG. 7 depicts an example BSSID's beacon 750 that can be used in a multi-link operation by the multi-link communications system 100 depicted in FIG. 1. In the example depicted in FIG. 7, the beacon 750 includes RNRs 752-1, 752-2, 752-3, an ML IE 754-1, a BSSID element 758 that includes non-transmitted NBSSID Profiles 756-1, 756-2, which include ML IEs 754-2, 754-3, respectively.

Figure 8:
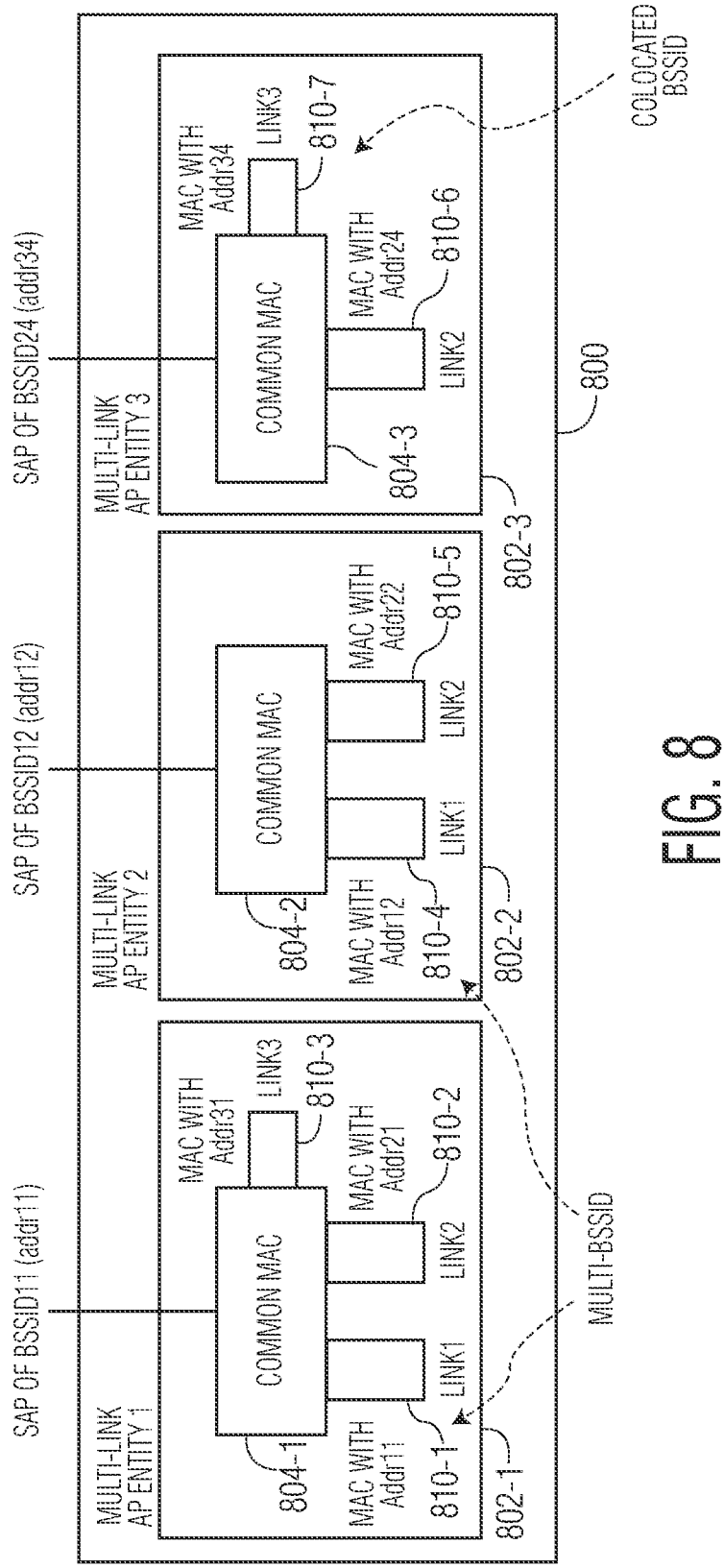
FIG. 8 depicts a device that includes multiple AP MLDs in accordance with an embodiment of the invention.

FIG. 8 depicts a device 800 that includes multiple AP MLDs 802-1, 802-2, 802-3 in accordance with an embodiment of the invention. In the embodiment depicted in FIG. 8, the AP MLD 802-1 with an address (e.g., MAC address), addr11, includes multiple APs 810-1, 810-2, 810-3 with addresses (e.g., MAC addresses), Addr11, Addr21, Addr31, and a common MAC unit or interface 804-1 that is connected to the APs 810-1, 810-2, 810-3, the AP MLD 802-2 with an address (e.g., MAC address), addr12, includes multiple APs 810-4, 810-5 with addresses (e.g., MAC addresses), Addr12, Addr22, and a common MAC unit or interface 804-2 that is connected to the APs 810-4, 810-5, and the AP MLD 802-3 with an address (e.g., MAC address), addr34, includes multiple APs 810-6, 810-7 with addresses (e.g., MAC addresses), Addr24, Addr34, and a common MAC unit or interface 804-3 that is connected to the APs 810-6, 810-7. At least one of the APs 810-1, 810-2, 810-3, 810-4, 810-5, 810-6, 810-7 may be fully or partially implemented as an IC device. In some embodiments, the APs 810-1, 810-2, 810-3, 810-4, 810-5, 810-6, 810-7 and their affiliated AP MLDs are compatible with at least one WLAN communications protocol (e.g., at least one IEEE 802.11 protocol). For example, the APs 810-1, 810-2, 810-3, 810-4, 810-5, 810-6, 810-7 and their affiliated AP MLDs may be compatible with an IEEE 802.11be protocol. In the embodiment depicted in FIG. 8, the APs 810-1, 810-2, 810-3, 810-4, 810-5, 810-6, 810-7 communicate with other entities through multiple communications links. Although the AP MLDs 802-1, 802-2, 802-3 are shown in FIG. 8 as including a specific number of APs, other embodiments of the AP MLDs 802-1, 802-2, 802-3 may include different number of APs. In addition, although the AP MLDs 802-1, 802-2, 802-3 communicate (e.g., wirelessly communicates) with other entities through a specific number of links, in other embodiments, the AP MLDs 802-1, 802-2, 802-3 may communicate (e.g., wirelessly communicates) with other entities through different number of communications links.

Figure 9:
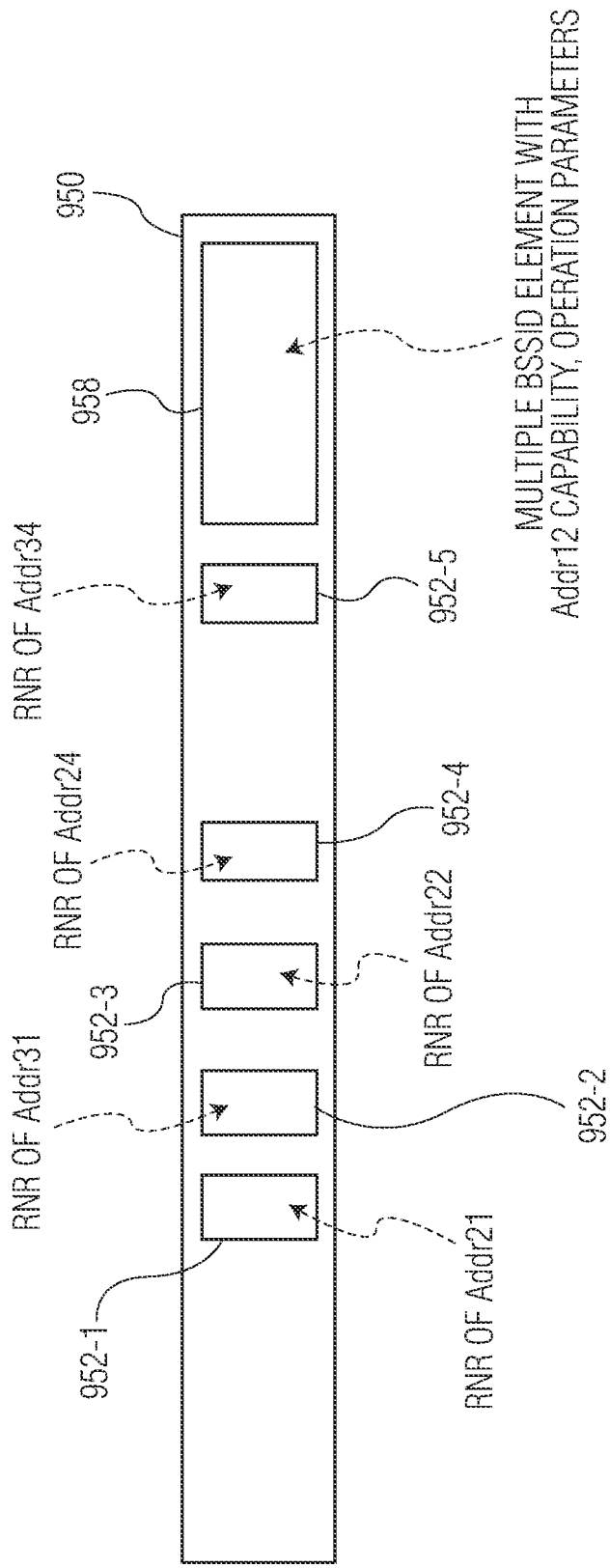
FIG. 9 depicts another example BSSID's beacon that can be used in a multi-link operation by the multi-link communications system depicted in FIG. 1.

FIG. 9 depicts an example BSSID's beacon 950 that can be used in a multi-link operation by the multi-link communications system 100 depicted in FIG. 1. In the example depicted in FIG. 9, the beacon 950, which is transmitted by an AP with BSSID of ADDR11, includes RNRs 952-1, 952-2, 952-3, 952-4, 952-5 with addresses (e.g., MAC addresses), Addr21, Addr31, Addr22, Addr24, and Addr 34, and a multiple BSSID element 958 with Addr12 capability, operation parameters.

In some embodiments, the RNR information of APs that are affiliated with the same AP MLD as the AP that transmits the management frame (e.g., beacon) are RNR element of the Beacon. For example, RNR information of AP of Addr 21, AP of Addr31 is carried in RNR element in a beacon. In some embodiments, the RNR information of APs that are affiliated with the same AP MLD as the AP that is in a non-transmitted BSSID profile are carried, for example, in RNR element. In some embodiments, the RNR information of an AP that is not affiliated with an AP MLD of transmitting AP or non-transmitted BSSID of the transmitting AP is in RNR element of a management frame (e.g., beacon) if the AP of the AP MLD is in the same device as the AP that transmits the management frame. For example, the AP (AP24, AP34) of an AP MLD is in the same device as the AP that transmits the management frame.

In some embodiments, when ML IE of an AP for AP's capabilities and operating parameters is included in a management frame, e.g., an Association Request/Response frame, the RNR for the AP is not in them. In some embodiments, both RNR and ML IE of an AP are included in a management frame, e.g., a beacon and/or a Probe Response frame.

In some embodiments, ML IE contains partial information of an AP (e.g., mainly used in Beacon). In some embodiments, ML IE contains full information of an AP (e.g., mainly used in Association Response or Probe Response when Probe Request frame solicits affiliated APs' all information.) Some capabilities operating parameters of the AP announced by ML IE may be inherited from the AP that transmits the frame or the non-transmitted BSSID with which the same MLD is affiliated.

In some embodiments, ML IE is used for association and other purpose. In some embodiments, MLD Type Common Info includes the type of MLD operation and the information common for multiple links. The ML IEs with different type values have different formats. In an embodiment, the type indicates the related operation of the management frame that contains the ML IE, e.g., type 1 of announcing capabilities, operating parameters, type 2 of target wake time (TWT) negotiation. In some embodiments, the common information for type 1 includes the MLD Service Access Point (SAP) address, MLD identifier. In an embodiment, the common information for type 1 includes the link identifier, e.g., 2.4 GHz link with link ID 0, 5 GHz link with link ID 1, 6 GHz link with link ID 2.

Figure 10:
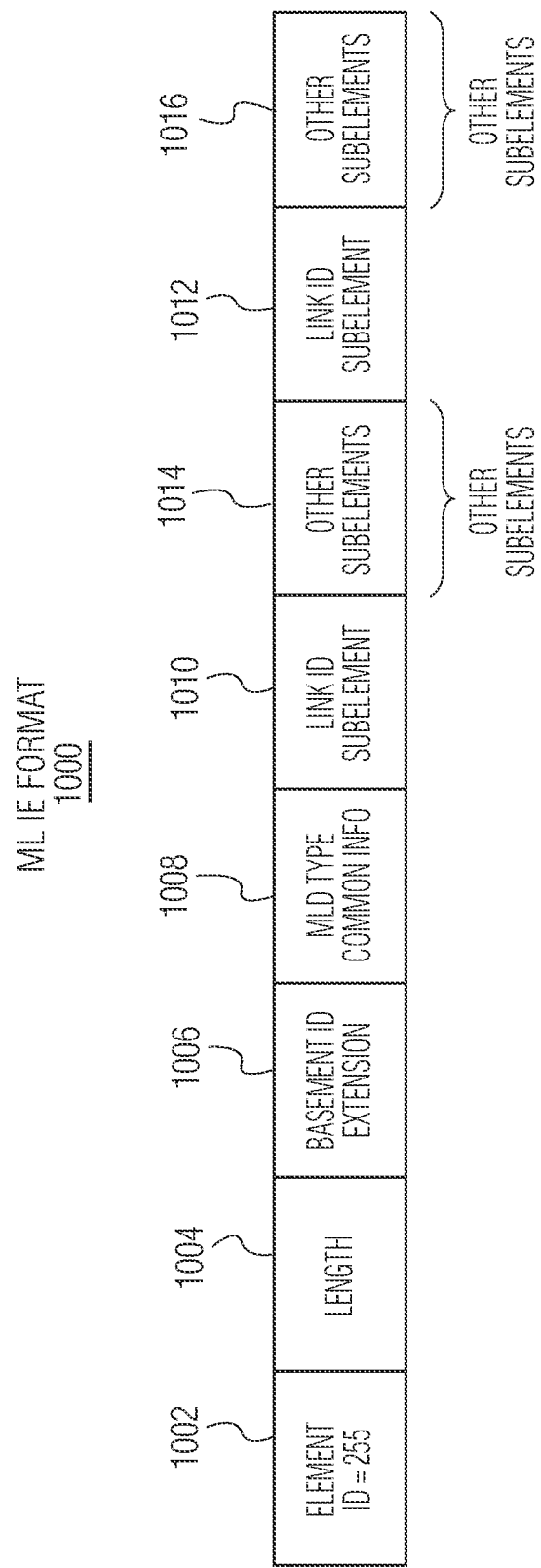
FIG. 10 depicts an example multi-link element or information element (ML IE) format that can be used in a multi-link operation by the multi-link communications system depicted in FIG. 1.

FIG. 10 depicts an example ML IE format 1000 that can be used in a multi-link operation by the multi-link communications system 100 depicted in FIG. 1. In the example depicted in FIG. 10, the ML IE format 1000 includes an element ID field 1002 (e.g., 1 octet) that may contain identification information this element represents, a length field 1004 that may contain element length information, an element ID extension field 1006, an MLD type common information field 1008, link ID subelement fields 1010, 1012, and other subelement fields 1014, 1016 that may include subelements different from, e.g., link ID subelements 1010, 1012.

Figure 11:
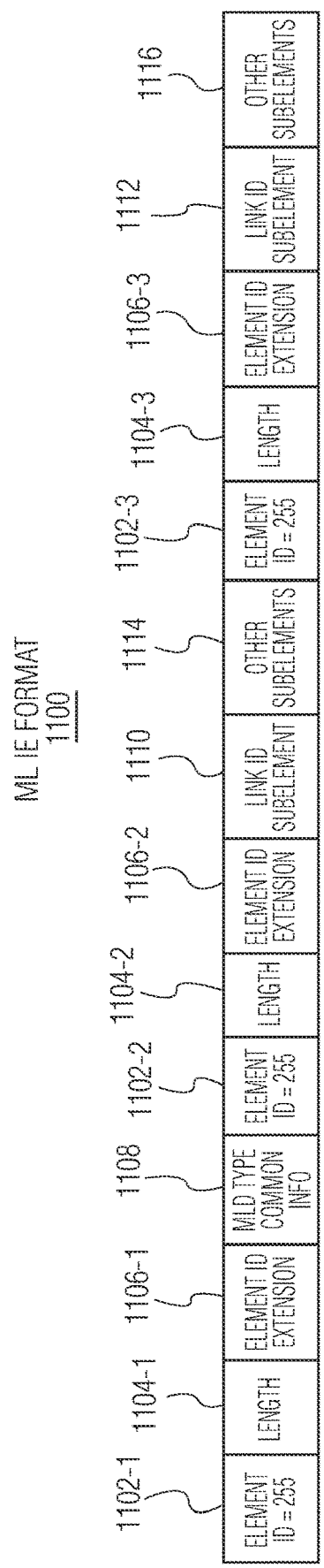
FIG. 11 depicts another example ML IE format that can be used in a multi-link operation by the multi-link communications system depicted in FIG. 1.

FIG. 11 depicts an example ML IE format 1100 that can be used in a multi-link operation by the multi-link communications system 100 depicted in FIG. 1. In the example depicted in FIG. 11, the ML IE format 1100 includes an element ID field 1102-1 (e.g., 1 octet) that may contain identification information this element represents, a length field 1104-1 that may contain element length information, an element ID extension field 1106-1, an MLD type common information field 1108, an element ID field 1102-2 (e.g., 1 octet) that may contain identification information this element represents, a length field 1104-2 that may contain element length information, an element ID extension field 1106-2, link ID subelement fields 1110, 1112, other subelement fields 1114, 1116 that may include subelements different from, e.g., link ID subelements 1110, 1112, an element ID field 1102-3 (e.g., 1 octet) that may contain identification information this element represents, and a length field 1104-3 that may contain element length information.

In some embodiments, the Probe Request frame includes the indication one of the following through a request type field/element:
- whether the STA MLD requests the full information of the reporting AP, the full information of the one reported AP where the reported AP and reporting AP are affiliated with the AP MLD (other reported APs affiliated with the same AP MLD s the reporting AP can be in enhanced RNR);
- whether the STA MLD requests the full information of the reporting AP, the full information of all the other reported APs where the reported APs and reporting AP are affiliated with the AP MLD;
- whether the STA MLD requests the update operating parameters of the reported AP.

Some embodiments of probe requests for full Information of a reported link are described as follows, for example, in Option 1, Option 2, Option 3, and Option 4. In Option 1, if a STA MLD wants to request the full information of an AP in a reported link of an AP MLD through the Probe Request in a reporting link, the Probe Request carries the Multi-link element (ML IE) that includes the full capabilities of the STA MLD in the reported link. The identifier of the reported link can be:
- Option 1.1: the link ID of the reported link if the STA MLD receives the Beacon from the AP MLD in the reporting link or acquired from the other method;
- Option 1.2: the band (channel class), or band + channel number of the reported link if the STA MLD receives the Beacon from the AP MLD in the reporting link or acquired from the other method.
- In option 1, the capabilities of the reporting link of STA MLD are carried in the Probe Request frame.

In Option 2, if a STA MLD wants to request the full information of an AP in a reported link of an AP MLD through the Probe Request in a reporting link, the Probe Request carries the Multi-link element (ML IE) that includes the link identifier of the reported link. The identifier of the reported link can be:
- Option 2.1: the link ID of the reported link if the STA MLD receives the Beacon from the AP MLD in the reporting link or acquired from the other method;
- Option 2.2: the band (channel class), or band + channel number of the reported link if the STA MLD receives the Beacon from the AP MLD in the reporting link or acquired from the other method. The full capabilities of the reported link of STA MLD are not required to be carried in the Probe Request.
- In option 2, the capabilities of the reporting link of STA MLD are carried in the Probe Request frame.

In Option 3, if a STA MLD wants to request the full information of an AP in a reported link of an AP MLD through the Probe Request in a reporting link, the Probe Request carries the Multi-link element (ML IE) that includes the full capabilities of the STA MLD in the reported link. The identifier of the reported link can be:
- Option 3.1: the link ID of the reported link if the STA MLD receives the Beacon from the AP MLD in the reporting link or acquired from the other method;
- Option 3.2: the band (channel class), or band + channel number of the reported link if the STA MLD receives the Beacon from the AP MLD in the reporting link or acquired from the other method.
- In option 3, the capabilities of the reporting link of STA MLD are not carried in the Probe Request frame. Probe Request frame include ML IE(s) with the reported link information (link ID) only.

In Option 4, if a STA MLD wants to request the full information of an AP in a reported link of an AP MLD through the Probe Request in a reporting link, the Probe Request carries the Multi-link element (ML IE) that includes the link identifier of the reported link. The identifier of the reported link can be:
- Option 4.1: the link ID of the reported link if the STA MLD receives the Beacon from the AP MLD in the reporting link or acquired from the other method;
- Option 4.2: the band (channel class), or band + channel number of the reported link if the STA MLD receives the Beacon from the AP MLD in the reporting link or acquired from the other method.
- In option 4, the full capabilities of the reported link of STA MLD are not required to be carried in the Probe Request. The capabilities of the reporting link of STA MLD are not carried in the Probe Request frame.

In some embodiments, if a STA MLD wants to request the critical update of an AP in a reported link of an AP MLD through the Probe Request in a reporting link, the Probe Request carries the Multi-link element (ML IE) that includes "Check Beacon"/"Critical Update" of the requested AP. The identifier of the reported link can be:
- Option 1.1: the link ID of the reported link if the STA MLD receives the Beacon from the AP MLD in the reporting link or acquired from the other method;
- Option 1.2: the band (channel class), or band + channel number of the reported link if the STA MLD receives the Beacon from the AP MLD in the reporting link or acquired from the other method.
- In this option, the capabilities of the reported link of STA MLD may be carried or not carried. The capabilities of the reporting link of STA MLD may be carried or not carried.

In some embodiments, an ML IE is only used for scanning, association, Probe Request/Response. An ML IE may include:
- Common Info part (may not be required for cross-link management frame transmission):
  - ML type (e.g., specific Action category, Action field value);
  - //NOTE: this field can be in Per Link Info part;

Bitmap of Option Fields;
MLD ID;
MLD MAC SAP address;
MLD common capabilities:
  Enhanced Spatial Reuse (ESR) capabilities (ESR number of spatial streams (Nss) per bandwidth (BW)+ Modulation and Coding Scheme (MCS) combination);
  A-MAC Protocol Data Unit (MPDU) Operation parameters (A-MPDU length, MPDU start spacing);
  MPDU parameter (maximal MPDU length, if the reporting link carries such information, this is not required);
  Security related parameters (if the reporting link carries such information, this is not required);
Per Link Info Profile (one or multiple):
  Link ID (one value can indicate not known if Beacon from AP MLD is not received and no other method exists to know the link's ID value);
  Band (could be in PHY capabilities);
  Fields per ML Type;
    Bitmap of Option Fields; //NOTE: whether an optional field is present or not;
    For Beacon and Probe Response: Address information, Capability Information;
    For Association Request: Address information, Capability Information;
    For (Re)Association Response: Address information, Capability Information;
    For Reassociation Request: Address information, Capability Information, Current AP address;
    Fields for each specific Action category, Action field value;
  Elements related to management subtype.

Figure 12:
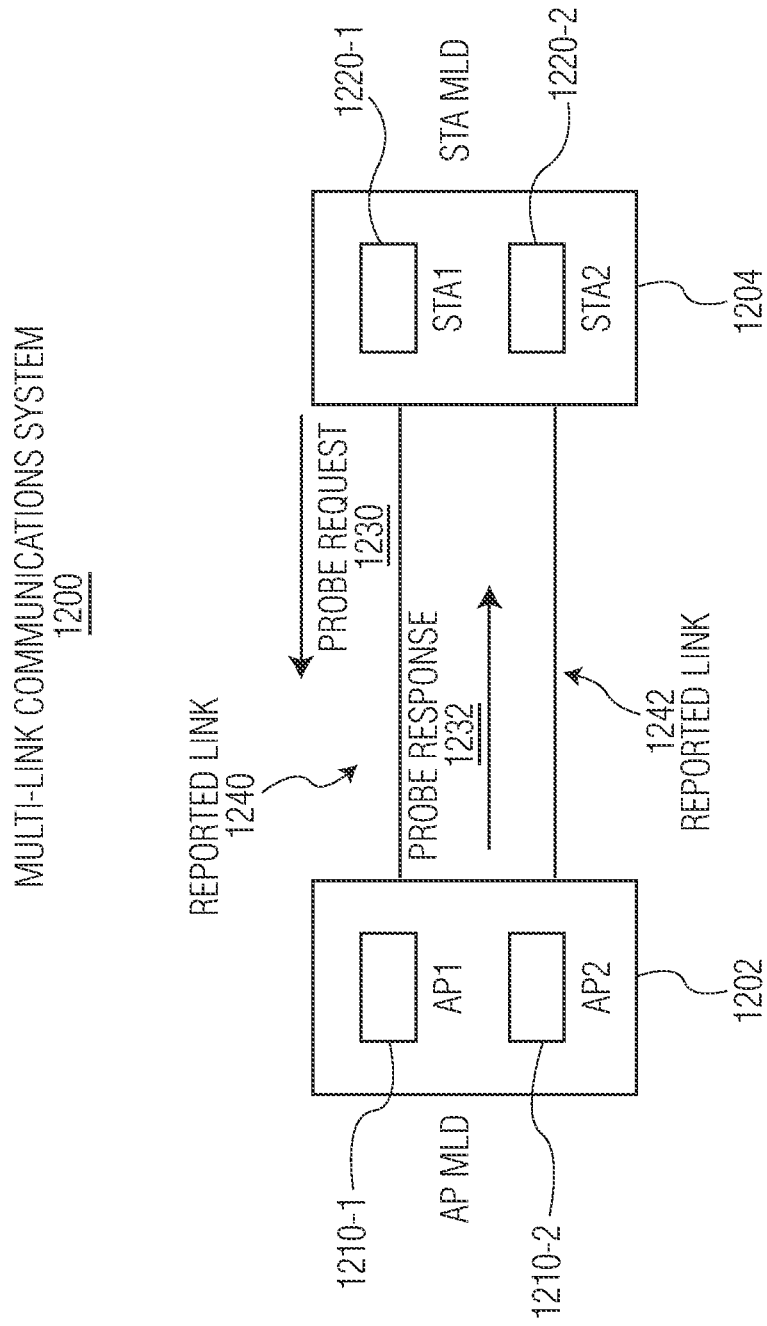
FIG. 12 depicts a multi-link communications system in accordance with an embodiment of the invention.

FIG. 12 depicts a multi-link communications system 1200 in accordance with an embodiment of the invention. In the embodiment depicted in FIG. 12, the multi-link communications system includes an AP MLD 1202 and an STA MLD 1204. In some embodiments, the multi-link communications system is a wireless communications system, such as a wireless communications system compatible with an Institute of Electrical and Electronics Engineers (IEEE) 802.11 protocol. For example, the multi-link communications system may be a wireless communications system compatible with an IEEE 802.11be protocol. In the embodiment depicted in FIG. 12, the AP MLD 102 includes multiple APs 1210-1, 1210-2, which may be implemented in hardware (e.g., circuits), software, firmware, or a combination thereof. In some embodiments, the AP MLD 102 and its affiliated APs 1210-1, 1210-2 are compatible with at least one WLAN communications protocol (e.g., at least one IEEE 802.11 protocol). For example, the AP MLD 102 and its affiliated APs 1210-1, 1210-2 may be compatible with an IEEE 802.11be protocol. In the embodiment depicted in FIG. 12, the STA MLD 1204 includes multiple STAs 1220-1, 1220-2, which may be implemented in hardware (e.g., circuits), software, firmware, or a combination thereof. At least one of the STAs 1220-1, 1220-2 may be fully or partially implemented as an IC device. In some embodiments, the STAs 1220-1, 1220-2 are wireless devices that wirelessly connect to wireless APs. For example, the STA MLD 1204 and its affiliated STAs 1220-1, 1220-2 may be a laptop, a desktop personal computer (PC), a mobile phone, or other wireless device that supports at least one WLAN communications protocol. In some embodiments, the STAs 1220-1, 1220-2 are wireless devices compatible with at least one IEEE 802.11 protocol (e.g., an IEEE 802.11be protocol). In an example operation of the multi-link communications system 1200 depicted in FIG. 12, a probe request 1230 is sent from the STA MLD 1204 to the AP MLD 1202 in a reporting link 1240 and a probe response 1232 is sent from the AP MLD 1202 to the STA MLD 1204 in a reported link 1242.

In some embodiments, the full MLD information is transmitted in (Re)Association Request/Response frames. In (Re)Association Response frame, it may not be necessary to transmit full MLD information for each AP MLD the AP device supports. In some embodiments, the full MLD information other than the MLD which AP MLD the STA MLD is establishing multi-link BSS association (multi-link setup) is not required. In some embodiments, the full MLD information of the MLD (all the capabilities, operating parameters of the APs) with which the STA MLD is establishing multi-link BSS association is required to be carried in (Re)Association Response frame.

Some embodiments of link information of request and response are described as follows. In some embodiments, in a multi-link (re)association Request frame, i.e., a (re)association Request frame with an ML IE, the link IDs in Per Link Profiles are requested for the association. In some embodiments, an AP MLD sends the (re)association Response with ML IE that includes all the requested link IDs. In some embodiments, an AP MLD sends the (re) association Response with ML IE that includes part of the requested link IDs. In some embodiments, the AP MLD rejects the request.

Some embodiments of MLD critical information announcement are described as follows. In some embodiments, the critical update report (e.g., event of Enhanced distributed channel access (EDCA) parameter change) of a reported AP is done through Check Beacon defined in 802.11 baseline. The Check Beacon can be in per link Info profile (reported AP profile). The Probe Request frame can include the indication one of the following through a request type field/element:
  whether the STA MLD requests the full information of the reporting AP, the full information of the one reported AP where the reported AP and reporting AP are affiliated with the AP MLD (e.g., other reported APs affiliated with the same AP MLD s the reporting AP can be in enhanced RNR);
  whether the STA MLD requests the full information of the reporting AP, the full information of all the other APs in enhanced RNR where the reported APs and reporting AP are affiliated with the AP MLD;
  Whether the STA MLD requests the update operating parameters of the reported AP. The STA MLD can acquire the full information of the reported AP (e.g., in ML IE with the full reported AP information) and the reporting AP through Probe Request/Response in the link of the reporting AP. The STA MLD can acquire the updated parameter only (e.g., EDCA Parameter) of the reported AP (in ML IE with the critical parameter update only of the reported AP) through Probe/Response. A Probe Request can include the indication of the soliciting of critical update. A Probe Response can include the critical update of the reported AP, or the critical update of the reported AP and the full information of the reporting AP.

In some embodiments, an ML IE is only used for requesting the updated link operating information of AP MLD's reported link other than the reporting link where the Probe Request is transmitted. In an embodiment, an ML IE includes common information part (may not be required for cross-link management frame transmission) such as MLD ID, MLD MAC SAP address, MLD common capabilities (e.g., idle with no information), and/or per Link Info Profile (one or multiple), which may include Link ID (one value can indicate not known if Beacon from AP MLD is not received and no other method exists to know the link's ID value) and/or Critical Update (Check Beacon).

In some embodiments, an ML IE is only used for announcing the updated link operating information of AP MLD's reported link other than the reporting link where the Probe Request is transmitted. In an embodiment, an ML IE includes common information part (may not be required for cross-link management frame transmission), such as MLD ID, MLD MAC SAP address, MLD common capabilities (e.g., idle with no information), and/or Per Link Info Profile (one or multiple), which may include Link ID (one value can indicate not known if Beacon from AP MLD is not received and no other method exists to know the link's ID value) and/or new operating parameters related to the requested Critical Update (Check Beacon).

Figure 13:
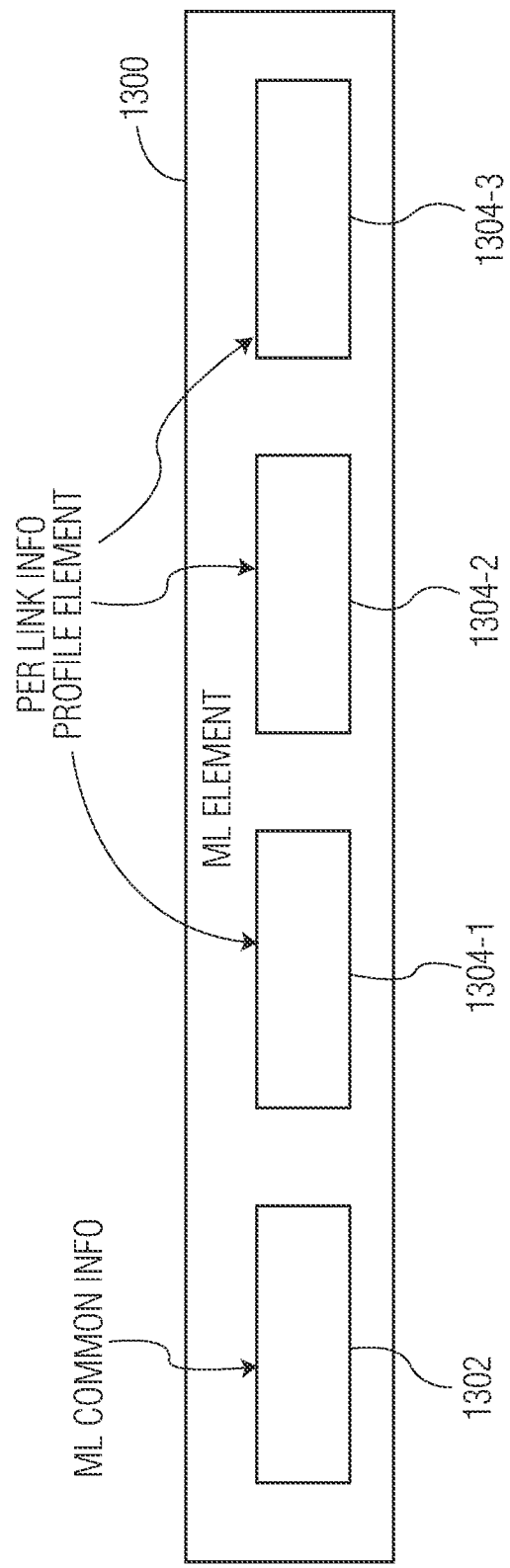
FIG. 13 depicts an example multi-link (ML) element format that can be used in a multi-link operation by the multi-link communications system depicted in FIG. 1.

FIG. 13 depicts an example ML IE format 1300 that can be used in a multi-link operation by the multi-link communications system 100 depicted in FIG. 1. In the embodiment depicted in FIG. 13, the ML IE format 1300 includes an ML Common Information (Info) section 1302, which can be fields or sub elements of the ML IE, and Per Link Info Profile elements 1304-1, 1304-2, 1304-3, which can be sub elements of the ML IE. In some embodiments, the ML IE always includes ML Common Info even if the information of an MLD is carried in multiple ML IEs.

Figure 14:
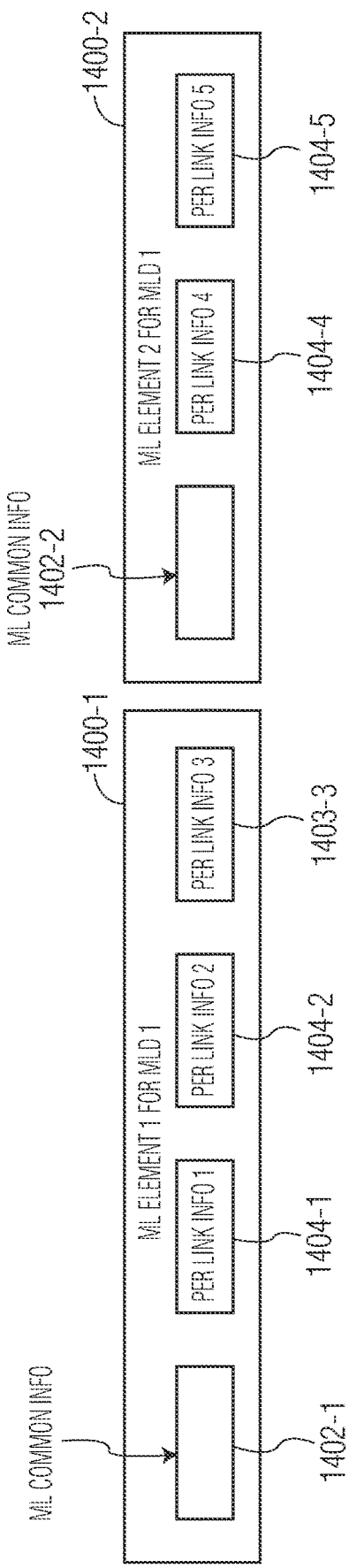
FIG. 14 depicts ML IEs of an MLD in accordance with the ML IE format depicted in FIG. 13.

FIG. 14 depicts ML IEs 1400-1, 1400-2 of an MLD in accordance with the ML IE format 1300 depicted in FIG. 13 when one ML IE cannot carry the whole information of an MLD. In one embodiment, all the ML IEs for a MLD carries the ML Common Info. In the embodiment depicted in FIG. 14, the ML IE 1400-1 of the MLD (MLD 1) includes an ML Common Information (Info) section 1402-1, which can be fields or sub elements of the ML IE, and Per Link Info Profile elements 1404-1, 1404-2, 1404-3, which can be sub elements of the ML IE. In the embodiment depicted in FIG. 14, the ML IE 1400-2 of the MLD (MLD 1) includes an ML Common Information (Info) section 1402-1, which can be fields or sub elements of the ML IE, and Per Link Info Profile elements 1404-4, 1404-5, which can be sub elements of the ML IE. In FIG. 14, the ML IEs always include ML Common Info when the information of the MLD (MLD 1) is carried in multiple ML IEs.

Figure 15:
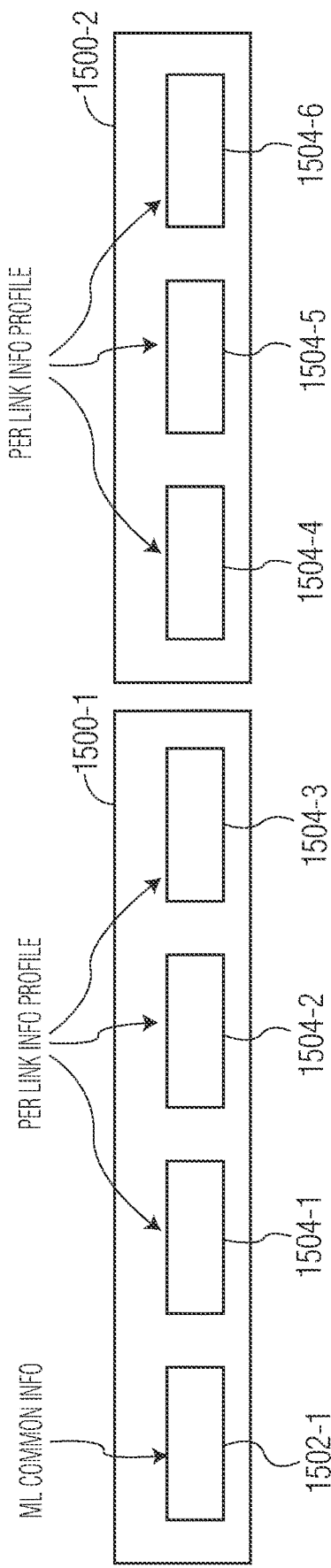
FIG. 15 depicts example ML IE formats of an MLD that can be used in a multi-link operation by the multi-link communications system depicted in FIG. 1.

FIG. 15 depict example ML IE formats 1500-1, 1500-2 of an MLD that can be used in a multi-link operation by the multi-link communications system 100 depicted in FIG. 1 when one ML IE cannot carry the whole information of an MLD. In one embodiment, only the first ML IE among the ML IEs for a MLD carries the ML Common Info. In the embodiment depicted in FIG. 15, the ML IE format 1500-1 of an MLD includes an ML Common Information (Info) section 1502-1, which can be fields or sub elements of the ML IE, and Per Link Info Profile elements 1504-1, 1504-2, 1504-3, which can be sub elements of the ML IE. In the embodiment depicted in FIG. 15, the ML IE format 1500-2 of the MLD includes Per Link Info Profile elements 1504-4, 1504-5, 1504-6, which can be sub elements of the ML IE. In the example formats depicted in FIG. 15, the first ML IE for an MLD includes ML Common Info, while the other ML IEs for the same MLD do not include ML Common Info.

Figure 16:
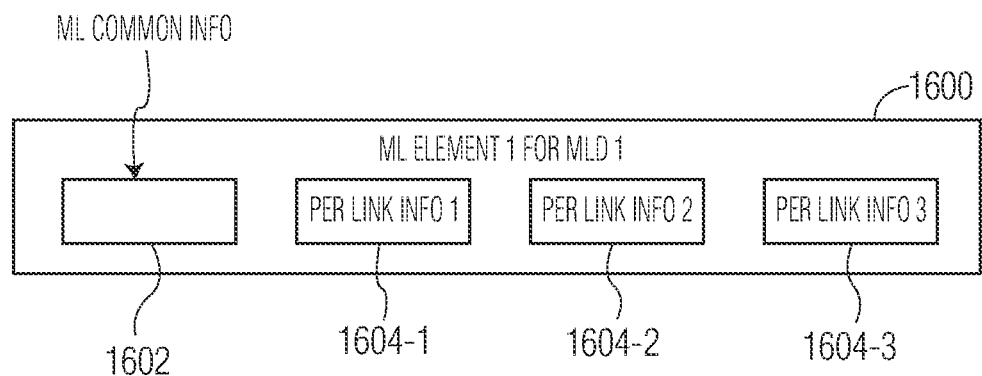
FIGS. 16 and 17 depict ML IEs of an MLD in accordance with the ML IE formats depicted in FIGS. 16 and 17.
Figure 17:
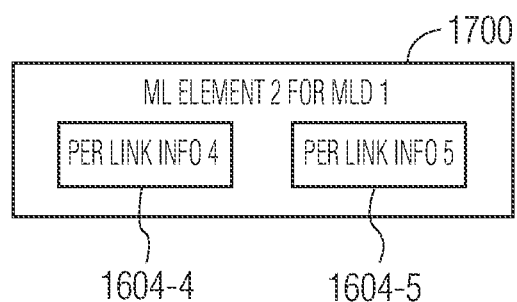

FIGS. 16 and 17 depict ML IEs 1600, 1700 of an MLD in accordance with the ML IE format 1500 depicted in FIG. 15. In the embodiment depicted in FIG. 16, the ML IE 1600 of the MLD (MLD 1) includes an ML Common Information (Info) section 1602, which can be fields or sub elements of the ML IE, and Per Link Info Profile elements 1604-1, 1604-2, 1604-3, which can be sub elements of the ML IE. In the embodiment depicted in FIG. 17, the ML IE 1700 of the MLD (MLD 1) includes Per Link Info Profile elements 1604-4, 1604-5, which can be sub elements of the ML IE. In FIGS. 16 and 17, the first ML IE for an MLD includes ML Common Info, while the second ML IE for the same MLD do not include ML Common Info.

Some embodiments of MLD critical information announcement are described as follows. The AP MLD can broadcast the full information of the reported AP with updated BSS operating parameters and the full information of the reporting AP through the Probe Response frame. The full information of the other APs affiliated with the AP MLD as the reporting AP may not be included. A management frame (Probe Response, Beacon) that only include the updated operating parameters of the reported AP can be broadcasted by the reporting AP. In some embodiments, when the BSS Color Change Announcement of the reported AP is carried in a Beacon, a value of 0 indicates that the switch occurs at the current TBTT if the TBTT of the reporting AP and TBTT of the reported AP are always same or at the next TBTT of the reported AP following the reporting AP's Beacon frame that carried the element otherwise. The Color Switch Countdown may be adjusted per the BI of the reported AP. In some embodiments, as a variant, when the BSS Color Change Announcement of the reported AP is carried in a Beacon, a value of 0 indicates that the switch occurs at the current TBTT if the TBTT of the reporting AP and TBTT of the reported AP are always the same or at the next TBTT of the reported AP following the TBTT related to the reporting AP's Beacon frame that carried the element otherwise.

Some embodiments of transmission of full information of a reported AP are described as follows. In some embodiments, the transmission of the full information of the reported AP is done per the request. For example, if an STA MLD requests full information of the reported AP, an AP MLD can at least transmit the full information of the reported AP. In some embodiments, an STA MLD does not request the full information of the reported APs if the STA MLD has received the full information of the reported AP. In some embodiments, the requested full information of the reported AP is carried in Beacon instead of Probe Response frame if the duration of next TBTT and the transmission time of the solicited Probe Response is no more than a threshold. In some embodiments, the request full information of the reported AP is carried in broadcast Probe Response frame.

Some examples of incomplete information after multi-link association are described as follows. In some embodiments, through the Probe Response in one link (e.g., link 1 as reporting link), an STA MLD may not know the Multiple BSSID arrangement. In an embodiment, the Per Link Info for an AP in another link (e.g., link2 as reported link) that has non-transmitted BSSID does not include the Multiple BSSID element. Every AP's Beacon in the reporting link may carry the information of reported AP in another reported link that is affiliated with the same AP MLD as the Beacon transmitter. In some embodiments, in an Association Response frame, the Multiple BSSID element and/or Multiple BSSID Configuration element of the reported link are not carried. After association, some features may not work correctly. For example, network allocation vector (NAV) maintenance may not work correctly. Some PLCP Protocol Data Units (PPDUs) from APs that are in the same device with an associated AP may be discarded. In another example, Rx Control Frame to MultiBSS does not work correctly (e.g., the transmitted BSSID is not known).

Some embodiments of acquiring full BSS Information are described as follows. In some embodiments, the RNR with a transmitted BSSID where non-transmitted BSSID of a reported AP is derived, or the Multiple BSSID element without non-transmitted BSSID profile and/or Multiple BSSID Index element in ML IE are transmitted in an Association Response frame. In some embodiments, a new element is defined to include the transmitted BSSID where non-transmitted BSSID of the reported AP is derived, the MaxBSSID Indicator.

If the ML IE in Probe Response and Association Response in one link (e.g., link 1 as reporting link) does not include the Multiple BSSID element of another reported link (e.g., link 2), an STA MLD may not know the Multiple BSSID arrangement of the reported link 2. The STA MLD cannot work correctly in link 2 without the Multiple BSSID information of link 2. In an embodiment, if an AP MLD has affiliated AP in reporting link (e.g., link 1) that does not support Multiple BSSID feature and AP affiliated AP with transmitted BSSID in a reported link, the Probe Response and Association Response in reporting link 1 needs to include multiple BSSID information of another reported link (e.g., link 2) in ML IE of related Per Link Info Profile. In one embodiment, the multiple BSSID information of another reported link (e.g., link 2) in ML IE of related Per Link Info Profile is the Multiple BSSID element without non-transmitted BSSID profile and/or Multiple BSSID Configuration element with MaxBSSID Indicator. In some embodiments, a new element is defined to at least include the MaxBSSID Indicator.

An MLD needs to announce whether its every two-link pair support simultaneous transmission while receive capability (STR capability support indication) between the two links. For the reported link, the STR capability support indication with each other link is indicated through a bitmap within the Per Link Profile of the reported link, e.g., the n-th bit indicates whether the reported link has STR capability with the link with link ID n (the link Id starts from 0). In one embodiment, for the reporting link, the STR capability support indication with each other link is indicated in the Common Info of the ML IE, e.g., the n-th bit indicates whether the reporting link has STR capability with the link with link ID n (the link Id starts from 0). In another embodiment, for the reporting link, the STR capability support indication with each other link is indicated in the Per Link Profile of the ML IE related to the reporting link. Further the Per Link Profile of the ML IE related to the reporting link only includes the STR support indication.

An MLD may add or delete link after the association. In one embodiment, within the ML IE for adding a link in the Adding Link Action frame, the STR support of new added link with every other working link is announced in the Per Link Profile of the added link. In another embodiment, within the Per Link Profile of every already working link in ML IE in the Adding Link Action frame, at least the STR support between the already working link and new added link is announced.

Figure 18:
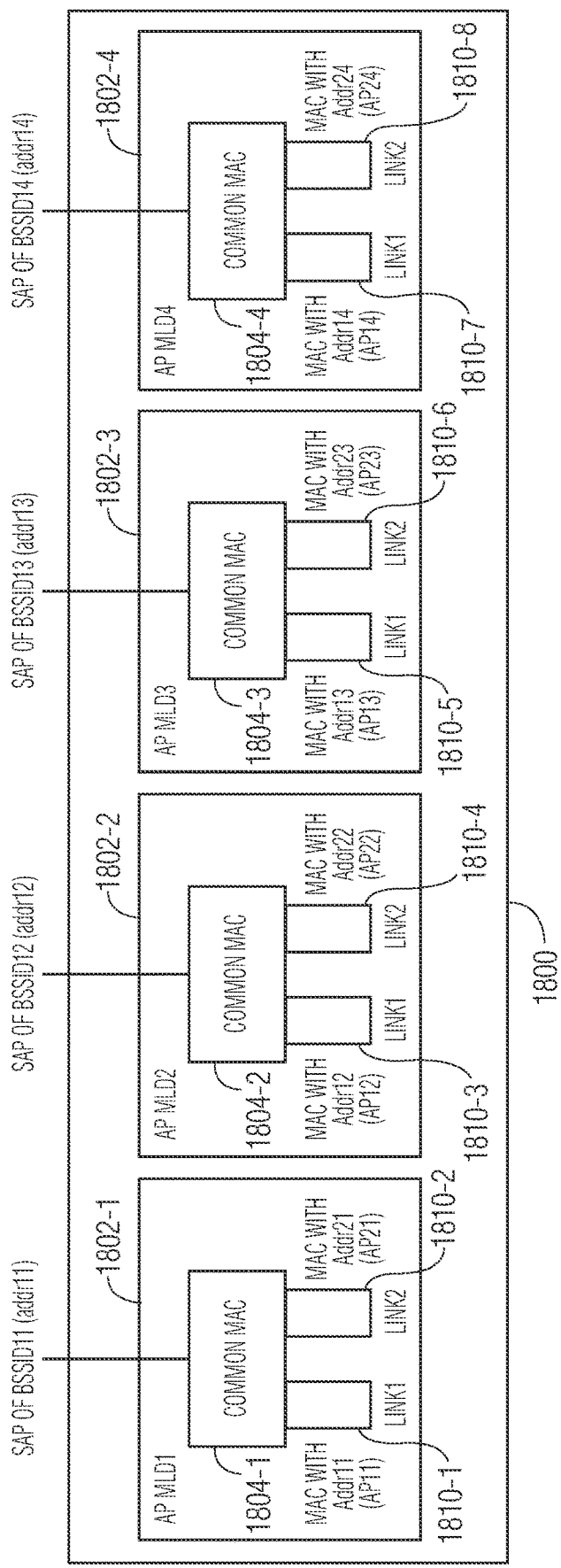
FIG. 18 depicts a device that includes multiple AP MLDs in accordance with an embodiment of the invention.

FIG. 18 depicts a device 1800 that includes multiple AP MLDs 1802-1, 1802-2, 1802-3, 1802-4 in accordance with an embodiment of the invention. In the embodiment depicted in FIG. 18, the AP MLD 1802-1 with an address (e.g., MAC SAP address), addr11, includes multiple APs 1810-1, 1810-2 with addresses (e.g., MAC addresses), Addr11, Addr21, and a common MAC unit or interface 1804-1 that is connected to the APs 1810-1, 1810-2, the AP MLD 1802-2 with an address (e.g., MAC SAP address), addr12, includes multiple APs 1810-3, 1810-4 with addresses (e.g., MAC addresses), Addr12, Addr22, and a common MAC unit or interface 1804-2 that is connected to the APs 1810-3, 1810-4, the AP MLD 1802-3 with an address (e.g., MAC SAP address), addr13, includes multiple APs 1810-5, 1810-6 with addresses (e.g., MAC addresses), Addr13, Addr23, and a common MAC unit or interface 1804-3 that is connected to the APs 1810-5, 1810-6, and the AP MLD 1802-4 with an address (e.g., MAC SAP address), addr14, includes multiple APs 1810-7, 1810-8 with addresses (e.g., MAC addresses), Addr14, Addr24, and a common MAC unit or interface 1804-4 that is connected to the APs 1810-7, 1810-8. In some embodiments, the APs with addresses Addr11, Addr12, Addr13, Addr14 are not defined by a Multiple BSSID element. In some embodiments, the APs with Addr21, Addr22, Addr23, Addr24 are defined by a Multiple BSSID element. In some embodiments, the APs 1810-1, 1810-2, 1810-3, 1810-4, 1810-5, 1810-6, 1810-7, 1810-8 are affiliated with one AP MLD. At least one of the APs 1810-1, 1810-2, 1810-3, 1810-4, 1810-5, 1810-6, 1810-7, 1810-8 may be fully or partially implemented as an IC device. In some embodiments, the APs 1810-1, 1810-2, 1810-3, 1810-4, 1810-5, 1810-6, 1810-7, 1810-8 are wireless APs compatible with at least one WLAN communications protocol (e.g., at least one IEEE 802.11 protocol). For example, the APs 1810-1, 1810-2, 1810-3, 1810-4, 1810-5, 1810-6, 1810-7, 1810-8 may be wireless APs compatible with an IEEE 802.11be protocol. In the embodiment depicted in FIG. 18, the APs 1810-1, 1810-2, 1810-3, 1810-4, 1810-5, 1810-6, 1810-7, 1810-8 communicate with other entities through multiple communications links. Although the AP MLDs 1802-1, 1802-2, 1802-3, 1802-4 are shown in FIG. 18 as including a specific number of APs, other embodiments of the AP MLDs 1802-1, 1802-2, 1802-3, 1802-4 may include different number of APs. In addition, although the AP MLDs 1802-1, 1802-2, 1802-3, 1802-4 communicate (e.g., wirelessly communicates) with other entities through a specific number of links, in other embodiments, the AP MLDs 1802-1, 1802-2, 1802-3, 1802-4 may communicate (e.g., wirelessly communicates) with other entities through different number of communications links.

Some embodiments of non-inheritance indication are described as follows. In some embodiments, the per link information for a reported AP in ML IE indicates whether whole information of the reported AP is carried (e.g., one bit for such indication). If the per link information for a reported AP in ML IE does not indicate that the whole information is carried, the inheritance that is similar to IEEE802.11ax is not applied.

In some embodiments, a management frame only includes the information of the reported link. For example, the Probe Request includes the information of the reported link through ML IE. In some embodiments, the elements of the reporting link are not carried. The fields in the Probe Request frame can be the reported link information except that the timestamp field carries the Timing synchronization function (TSF) time of the reporting link. Another option is that the frame does not include the fields in the frame body that do not belong to any element.

Figure 19:
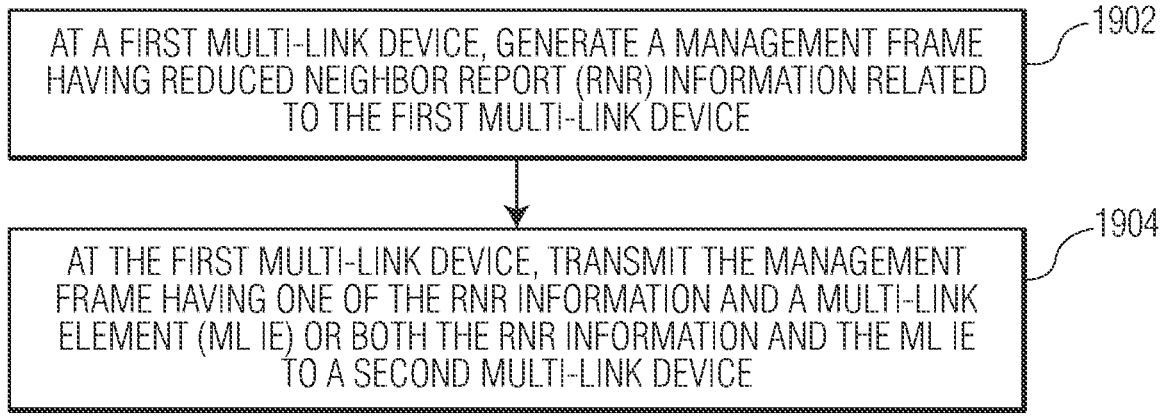
FIG. 19 is a process flow diagram of a method of multi-link communications in accordance to an embodiment of the invention.

FIG. 19 is a process flow diagram of a method of multi-link communications in accordance to an embodiment of the invention. According to the method, at block 1902, at a first multi-link device, a management frame having reduced neighbor report (RNR) information related to the first multi-link device is generated. At block 1904, at the first multi-link device, the management frame having one of the RNR information and a multi-link element (ML IE) or both the RNR information and the ML IE is transmitted to a second multi-link device. In some embodiments, the management frame includes a beacon frame, a probe response frame, an association response frame, a probe request frame, or an association request frame. In some embodiments, the first multi-link device includes an access point (AP) multi-link device, and the RNR information includes a link identifier and a multi-link device identifier to identify an AP of the AP multi-link device. In some embodiments, a link identifier of each AP in the AP multi-link device is uniquely coded in RNR information announced by different APs of the AP multi-link device. In some embodiments, a multi-link (ML) element carried in the management frame includes ML common information and per link information profiles of a reported link between the first multi-link device and the second multi-link device. In some embodiments, the ML common information includes a type of an ML IE to define the format of the ML IE. In some embodiments, the ML common information includes a Media Access Control (MAC) address of the first multi-link device. In some embodiments, the management frame includes a probe request frame that includes information that indicates whether full information or partial information of an access point (AP) is requested. In some embodiments, the probe request frame further includes an indication of a soliciting of a critical update. In some embodiments, the first multi-link device includes a non-access point (AP) multi-link device, wherein the second multi-link device includes an AP multi-link device, and the probe request frame further includes a multi-link element that includes a link identifier of a reported link when the non-AP multi-link device requests full information of an AP of the AP multi-link device in the reported link. In some embodiments, the requested full information of the AP is carried in a beacon frame. In some embodiments, the first multi-link device includes a non-access point (AP) multi-link device, wherein the second multi-link device includes an AP multi-link device, and wherein an indication for critical update and a link identifier are carried in a per link profile to request a critical update of an AP identified by the link identifier. In some embodiments, the first and second multi-link devices are compatible with an Institute of Electrical and Electronics Engineers (IEEE) 802.11 protocol. The first multi-link device may be similar to, the same as, or a component of the AP MLD 102 depicted in FIG. 1, the AP MLD 202 depicted in FIG. 2, the AP MLD 802-1, 802-2, 802-3 depicted in FIG. 8, the AP MLD 1202 depicted in FIG. 12, the AP MLD 1802-1, 1802-2, 1802-3, 1802-4 depicted in FIG. 18, the non-AP MLDs 104-1, 104-2, 104-3 depicted in FIG. 1, and/or the STA MLD 1204 depicted in FIG. 12. The second multi-link device may be similar to, the same as, or a component of the AP MLD 102 depicted in FIG. 1, the AP MLD 202 depicted in FIG. 2, the AP MLD 802-1, 802-2, 802-3 depicted in FIG. 8, the AP MLD 1202 depicted in FIG. 12, the AP MLD 1802-1, 1802-2, 1802-3, 1802-4 depicted in FIG. 18, the non-AP MLDs 104-1, 104-2, 104-3 depicted in FIG. 1, and/or the STA MLD 1204 depicted in FIG. 12.

Figure 20:
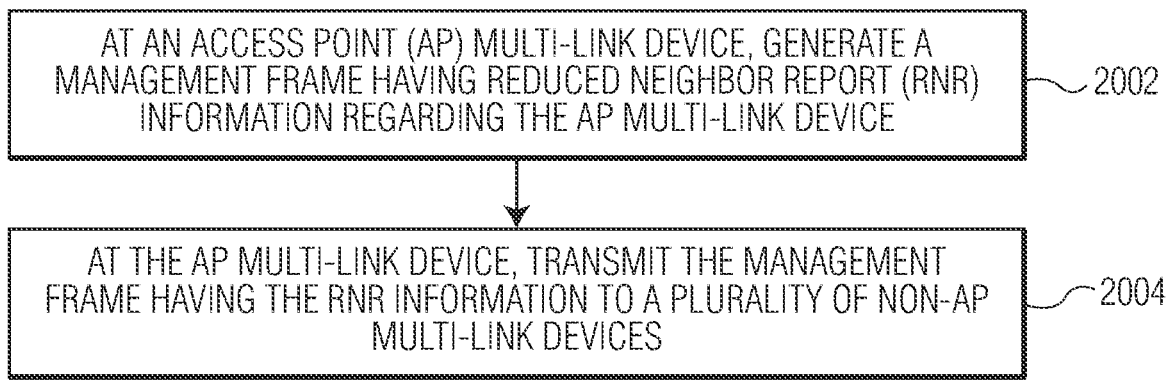
FIG. 20 is a process flow diagram of a method of multi-link communications in accordance to an embodiment of the invention.

FIG. 20 is a process flow diagram of a method of multi-link communications in accordance to an embodiment of the invention. According to the method, at block 2002, at an access point (AP) multi-link device, a management frame having reduced neighbor report (RNR) information regarding the AP multi-link device is generated. At block 2004, at the AP multi-link device, the management frame having the RNR information is transmitted to a plurality of non-AP multi-link devices. In some embodiments, the management frame includes a beacon frame, a probe response frame, or an association response frame. In some embodiments, the RNR information includes a link identifier and a multi-link device identifier to identify an AP of the AP multi-link device. In some embodiments, a link identifier of each AP in the AP multi-link device is uniquely coded in RNR information announced by different APs of the AP multi-link device. In some embodiments, a multi-link (ML) element carried in the management frame includes ML common information and per link information profiles of a reported link between the AP multi-link device and the non-AP multi-link devices. In some embodiments, the ML common information includes a type of a multi-link device operation and information common for multiple communications links. In some embodiments, the ML common information includes a Media Access Control (MAC) address of the AP multi-link device. The AP multi-link device may be similar to, the same as, or a component of the AP MLD 102 depicted in FIG. 1, the AP MLD 202 depicted in FIG. 2, the AP MLD 802-1, 802-2, 802-3 depicted in FIG. 8, the AP MLD 1202 depicted in FIG. 12, and/or the AP MLD 1802-1, 1802-2, 1802-3, 1802-4 depicted in FIG. 18. The non-AP multi-link devices may be similar to, the same as, or a component of the non-AP MLDs 104-1, 104-2, 104-3 depicted in FIG. 1 and/or the STA MLD 1204 depicted in FIG. 12.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of multi-link communications, the method comprising:
    at a first multi-link device, generating a management frame; and at the first multi-link device, transmitting the management frame to a second multi-link device:
wherein the management frame comprises a probe request frame that includes information that indicates whether full information or partial information of an access point (AP) is requested;
wherein the first multi-link device comprises a non-access point (AP) multi-link device, wherein the second multi-link device comprises an AP multi-link device, and wherein the probe request frame further includes a multi-link element that includes a link identifier of a reported link when the non-AP multi-link device requests full information of an AP of the AP multi-link device in the reported link.

2. The method of claim 1, wherein the management frame comprises a probe request frame or an association request frame.

3. The method of claim 1, wherein the second multi-link device transmits a management frame having reduced neighbor report (RNR) information which includes a link identifier and a multi-link device identifier to identify an AP of the AP multi-link device.

4. The method of claim 3, wherein a link identifier of each AP in the AP multi-link device is uniquely coded in the RNR information announced by different APs of the AP multi-link device.

5. The method of claim 3, wherein a multi-link information element (ML IQ carried in the management frame transmitted by the second multi-link device includes ML common information and a respective per link information profile of a reported link between the first multi-link device and the second multi-link device.

6. The method of claim 5, wherein the ML common information includes a type of a multi-link device operation and information common for multiple communications links.

7. The method of claim 5, wherein the ML common information includes a Media Access Control (MAC) address of the first multi-link device.

8. The method of claim 1, wherein the probe request frame further includes an indication of soliciting of a critical update.

9. The method of claim 1, wherein the requested full information of the AP is carried in a beacon frame.

10. The method of claim 1, wherein an indication for critical update and flail the link identifier are carried in a per link profile to request a critical update of the AP identified by the link identifier.

11. The method of claim 1, wherein the first and second multi-link devices are compatible with an Institute of Electrical and Electronics Engineers (IEEE) 802.11 protocol.

12. A multi-link communications system comprising:
a first multi-link device configured to:
generate a management frame; and
transmit the management frame to a second multi-link device; and
the second multi-link device;
wherein the management frame comprises a probe request frame that includes information that indicates whether full information or partial information of an access point (AP) is requested;
wherein the first multi-link device comprises a non-access point (AP) multi-link device, wherein the second multi-link device comprises a AP multi-link device, and wherein the probe request frame further includes a multi-link element that includes a link identifier of a reported link when the non-AP multi-link device requests full information of an AP of the AP multi-link device in the reported link.

13. The multi-link communications system of claim 12, wherein the first and second multi-link devices are compatible with an Institute of Electrical and Electronics Engineers (IEEE) 802.11 protocol.

14. A method of multi-link communications, the method comprising:
at an access point (AP) multi-link device, generating a management frame having reduced neighbor report (RNR) information regarding the AP multi-link device; and
at the AP multi-link device, transmitting the management frame having the RNR information to a plurality of non-AP multi-link devices;
wherein the management frame is transmitted in response to a probe request frame that includes information that indicates whether full information or partial information of an access point (AP) is requested; and
wherein the probe request frame further includes a multi-link element that includes a link identifier of a reported link when the non-AP multi-link device requests full information of an AP of the AP multi-link device in the reported link.

15. The method of claim 14, wherein the management frame comprises a beacon frame, a probe response frame, or an association response frame.

16. The method of claim 14, wherein the RNR information includes a link identifier and a multi-link device identifier to identify an AP of the AP multi-link device.

17. The method of claim 16, wherein a link identifier of each AP in the AP multi-link device is uniquely coded in RNR information announced by different APs of the AP multi-link device.

18. The method of claim 14, wherein a multi-link (ML) element carried in the management frame includes ML common information and a plurality of respective per link information profile of a reported link between the AP multi-link device and the non-AP multi-link devices.

* * * * *